US012245316B2

(12) United States Patent
Teyeb et al.

(10) Patent No.: US 12,245,316 B2
(45) Date of Patent: Mar. 4, 2025

(54) RESUMING SCG, SYNCHRONIZATION ASPECTS

(71) Applicant: Telefonaktiebolaget LM Ericsson (publ), Stockholm (SE)

(72) Inventors: Oumer Teyeb, Montréal (CA); Patrik Rugeland, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 340 days.

(21) Appl. No.: 17/764,775

(22) PCT Filed: Sep. 8, 2020

(86) PCT No.: PCT/SE2020/050844
§ 371 (c)(1),
(2) Date: Mar. 29, 2022

(87) PCT Pub. No.: WO2021/066701
PCT Pub. Date: Apr. 8, 2021

(65) Prior Publication Data
US 2022/0369412 A1 Nov. 17, 2022

Related U.S. Application Data

(60) Provisional application No. 62/910,102, filed on Oct. 3, 2019.

(51) Int. Cl.
*H04W 76/27* (2018.01)
*H04W 74/0833* (2024.01)
*H04W 76/16* (2018.01)

(52) U.S. Cl.
CPC ....... *H04W 76/27* (2018.02); *H04W 74/0833* (2013.01); *H04W 76/16* (2018.02)

(58) Field of Classification Search
CPC . H04W 74/0833; H04W 76/16; H04W 76/27; H04W 74/0836; H04W 74/0838
See application file for complete search history.

(56) References Cited

U.S. PATENT DOCUMENTS

2015/0208235 A1* 7/2015 Ingale ............... H04W 74/0833
455/411
2017/0374688 A1* 12/2017 Lee .......................... H04L 5/001
(Continued)

OTHER PUBLICATIONS

Ericsson, "Multiple inactive SCG configurations", 3GPP TSG-RAN WG2 #107; Tdoc R2-1910265; Prague, Czech Republic, Aug. 26-30, 2019, 1-3.

(Continued)

*Primary Examiner* — Stephen J Clawson
(74) *Attorney, Agent, or Firm* — Murphy, Bilak & Homiller, PLLC

(57) ABSTRACT

Systems and methods are disclosed herein for resuming a connection of a wireless communication device suspension to a dormant state while the wireless communication device was operating in dual connectivity with a Master Cell Group (MCG) with a first network node and a Secondary Cell Group (SCG) with a second network node. In one embodiment, a method performed by the wireless communication device comprises receiving a connection resume message with an indication to restore the SCG of the wireless communication device, where the connection resume message comprises information that is mandatory when the connection resume message comprises an indication to restore the SCG. The information that is mandatory comprises information that triggers synchronization and random access towards a Primary SCG Cell (PSCell) (e.g., reconfigurationWithSync or mobilityControlInfoSCG). The method further comprises restoring the SCG in accordance with the connection resume message. Corresponding
(Continued)

3GPP Scenarios, LTE and NR Interworking Options embodiments of a wireless communication device are also disclosed.

19 Claims, 12 Drawing Sheets

(56) References Cited

U.S. PATENT DOCUMENTS

| | | | | |
|---|---|---|---|---|
| 2019/0182881 | A1 | 6/2019 | Teyeb et al. | |
| 2019/0215887 | A1* | 7/2019 | Burbidge | H04W 76/27 |
| 2021/0045174 | A1* | 2/2021 | Choi | H04L 5/14 |
| 2021/0329510 | A1* | 10/2021 | Tseng | H04W 36/0079 |
| 2022/0046522 | A1* | 2/2022 | Kim | H04W 52/365 |
| 2022/0132607 | A1* | 4/2022 | Yilmaz | H04W 68/02 |
| 2023/0068134 | A1* | 3/2023 | Teyeb | H04W 76/27 |
| 2023/0116886 | A1* | 4/2023 | Kim | H04W 76/27 370/328 |
| 2023/0217525 | A1* | 7/2023 | Kim | H04W 76/20 370/329 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.7.0, Sep. 2019, 1-962.

3GPP, "3rd Generation Partnership Project; Technical Specification Group Radio Access Network; NR; Radio Resource Control (RRC) protocol specification (Release 15)", 3GPP TS 38.331 V15.7.0, Sep. 2019, 1-527.

Ericsson, "Configuring or resuming (NG)EN-DC during connection resume (36.331)", 3GPP TSG-RAN WG2 Meeting #107, R2-1910261, Resubmission of R2-1906003, Prague, Czech Republic, Aug. 26-30, 2019, 1-8.

Ericsson, "Configuring or resuming NR-DC or NE-DC during connection resume (38.331)", 3GPP TSG-RAN WG2 Meeting #107, R2-1910262, Resubmission of R2-1906004, Prague, Czech Republic, Aug. 26-30, 2019, 1-9.

Ericsson, "Handover at resume", 3GPP TSG-RAN WG2 #107, Tdoc R2-1910267, Prague, Czech Republic, Aug. 26-30, 2019, 1-4.

Ericsson, "Handover in Resume procedure", 3GPP TSG-RAN WG2#104, Tdoc R2-1818459, Spokane, Washington, USA,, Nov. 12-16, 2018, 1-9.

Ericsson, "Secondary Node Resume in NE-DC and NN-DC (TP to 38.300)", 3GPP TSG-RAN WG2 #103, R2-1811577, (Revision of R2-1810251), Gothenburg, Sweden, Aug. 20-24, 2018, 1-6.

* cited by examiner

*3GPP Scenarios, LTE and NR Interworking Options*

*User plane protocol stack*

*Control plane protocol stack*

Network side protocol termination options for MCG, SCG and split bearers in MR-DC with 5GC (NGEN-DC, NE-DC and NR-DC)

UE state machine and state transitions between NR/5GC, E-UTRA/EPC and E-UTRA/5GC

RESUMING SCG, SYNCHRONIZATION ASPECTS

RELATED APPLICATIONS

This application claims the benefit of provisional patent application Ser. No. 62/910,102, filed Oct. 3, 2019, the disclosure of which is hereby incorporated herein by reference in its entirety.

TECHNICAL FIELD

The present disclosure relates to connection resume in a cellular communications system.

BACKGROUND

There may be different ways to deploy a Fifth Generation (5G) network with or without interworking with Long Term Evolution (LTE), which is also referred to as Evolved Universal Terrestrial Radio Access (E-UTRA), and Evolved Packet Core (EPC), as depicted in FIG. 1. The illustrated options are:
Option 1: standalone LTE connected to EPC;
Option 2: Standalone New Radio (NR) connected to 5G Core Network (5GCN), or NR-NR Dual Connectivity (DC);
Option 3: LTE E-UTRA NR DC (EN-DC) connected to EPC;
Option 4: LTE NR E-UTRA DC (NE-DC), connected to 5GCN;
Option 5: LTE connected to 5GCN (enhanced LTE (eLTE) or LTE-5GCN); and
Option 7: LTE-NR DC, connected to 5GCN (Next Generation Radio Access Network (RAN) E-UTRA NR DC (NGEN-DC)).

In principle, NR and LTE can be deployed without any interworking, denoted by NR Stand-Alone (SA) operation. Accordingly, an NR RAN node (referred to as an NR base station (gNB) in NR) can be connected to a 5GCN and an enhanced or evolved Node B (eNB) in LTE can be connected to an EPC with no interconnection between the two (Option 1 and Option 2 in FIG. 1). On the other hand, the first supported version of NR is the so-called EN-DC, illustrated by Option 3 of FIG. 1. In such a deployment, DC between NR and LTE is implemented with LTE functioning as the master node and NR functioning as the secondary node. The RAN node (gNB) supporting NR may not have a control plane connection to the core network (EPC); instead, it relies on the LTE RAN node (eNB) as master node (referred to as a Master eNB (MeNB)). This is also referred to as "Non-SA NR." Notice that in this case the functionality of an NR cell is limited and would be used for connected mode User Equipments (UEs) as a booster and/or diversity leg, but an RRC_IDLE UE cannot camp on these NR cells.

With the introduction of 5GCN, other options may be also valid. As mentioned above, Option 2 supports SA NR deployment where the gNB is connected to the 5GCN. Similarly, LTE can also be connected to the 5GCN using Option 5 (also known as eLTE, E-UTRA/5GCN, or LTE/ 5GCN and the node can be referred to as a next generation eNB (ng-eNB)). In these cases, both NR and LTE are seen as part of the Next Generation RAN (NG-RAN) (and both the ng-eNB and the gNB can be referred to as NG-RAN nodes). It is worth noting that Option 4 and Option 7 of FIG. 1 are other variants of DC between LTE and NR which will be standardized as part of NG-RAN connected to 5GCN, denoted by Multi-Radio DC (MR-DC). Options 6 and 8 of FIG. 1, where the gNB is connected to the EPC (with and without interconnectivity to LTE), are also possible, although they seem to be less practical and hence they will not be pursued further in 3GPP.

As migration for these options may differ from different operators, it is possible to have deployments with multiple options in parallel in the same network. For example, an eNB base station may be configured to support Options 3, 5, and 7, while a gNB may be configured to support Options 2 and 4.

Bearer Configurations in NR

The User Plane (UP) and Control Plane (CP) protocol stacks in NR are shown in FIG. 2 and FIG. 3, respectively. When reconfiguring a UE, the NR network transmits an RRCReconfiguration message containing a RadioBearerConfig and a CellGroupConfig Information Element (IE). The RadioBearerConfig configures the Packet Data Convergence Protocol (PDCP) and Service Data Adaptation Protocol (SDAP) protocol layers for all Data Radio Bearers (DRBs) and the PDCP protocol layer for all Signaling Radio Bearers (SRBs). The CellGroupConfig configures the Radio Link Control (RLC), Medium Access Control (MAC), and Physical (PHY) layers for all Radio Bearers (RBs).

In the case of NR-DC, the RRCReconfiguration message may contain one or more RadioBearerConfig messages (e.g., radioBearerConfig and radioBearerConfig2) and one or more CellGroupConfig messages (e.g., masterCellGroup and secondaryCellGroup). Each RadioBearerConfig may contain a list of DRBs and/or SRBs, which are terminated in the respective node, as well as a configuration for the security algorithms to be used.

The CellGroupConfig on the other hand may contain configurations for one or more cells associated to a respective Master Node (MN) or a respective Secondary Node (SN). One of the cells may be denoted as a Special Cell (SpCell), (Primary Cell (PCell) or Primary Secondary Cell Group (SCG) Cell (PSCell)), which will be the primary cell used for communication. The other cells will be Secondary Cells (SCells) which are monitored in case any of them can provide better radio conditions than the SpCell. The CellGroupConfig may also contain a list of RLC bearers which are associated to a specific RB with the parameter servedRadioBearer.

As can be seen in FIG. 4, DRBs can be terminated in either the MN or the SN and be transmitted via either the Master Cell Group (MCG) (MCG bearer), SCG (SCG bearer), or both (split bearer). Any combination of MN and SN terminated bearers as well as MCG, SCG, and split bearers can be configured for a UE. For SRBs, SRB1 and SRB2 are terminated in the MN and can be either MCG or split bearers, whereas SRB3 is terminated in the SN and can only be an SCG bearer. Although the concept shown here shows the system connected to a 5GCN, the same principles applies to an EN-DC connected to an EPC.

When the UE is configured with two RadioBearerConfigs and two CellGroupConfigs, each RLC bearer in either CellGroupConfig can be associated to a RB terminating in either the MN or the SN. In case of split bearers, an RLC bearer in masterCellGroup and an RLC bearer in secondaryCellGroup are configured with the same RB identity in the servedRadioBearer.

In combination with DC solutions between LTE and NR, it is also possible to support Carrier Aggregation (CA) in each cell group (i.e., MCG and SCG). In that case, one or more of the SCells in the CellGroupConfig is also used to provide more radio resources to the UE. Initially, it was only DRBs which could be used in CA, but, in Release 15, PDCP duplication was introduced where the same data could be transmitted via two RLC bearers for both DRBs and SRBs to provide redundancies and increased reliability.

Suspended RRC Connection and RRC_INACTIVE in LTE/NR Release 15

FIG. 5 illustrates UE state machine and state transition between NR/5GCN, E-UTRA/EPC, and E-UTRA/5GCN. As can be seen in FIG. 5, it may be possible to move an ongoing UE connection (e.g., UE is in RRC_CONNECTED state) between two Radio Access Technologies (RATs) (e.g., NR/5GCN, E-UTRA/EPC, or E-UTRA/5GCN) using a handover procedure. Additionally, (not shown) it is possible for the network to move the UE to the other RAT by sending a Release message with re-direct information. When the UE is in IDLE or INACTIVE state, the cell reselection procedure will be used when transitioning between the RATs.

In NR and E-UTRA (i.e., LTE connected to 5GCN), there may exist a new RRC state called RRC_INACTIVE. Hereinafter, an NG-RAN refers to a RAN in which either an NR or an LTE RAN is connected to a 5GCN.

In RRC_INACTIVE, the UE stores certain configurations (e.g., DRB configurations and physical layer parameters). When the UE needs to resume the connection, it transmits an RRCConnectionResumeRequest and RRCResumeRequest in LTE and NR, respectively. The UE can then reuse the stored settings to help reduce the time and signaling needed to enter RRC_CONNECTED. In addition, in E-UTRA EPC, a suspended Radio Resource Control (RRC) connection state has been introduced. In this regard, when the UE enters RRC_IDLE from RRC_CONNECTED, it stores the configurations that can later be resumed.

In Release 15 (first release) of the NG-RAN standard, it has been agreed to not support direct transition between RRC_INACTIVE in LTE/E-UTRA and RRC_INACTIVE in NR. Hence, a Release 15 UE in RRC_INACTIVE in one RAT performing cell reselection to the other RAT would trigger the UE to release its Access Stratum (AS) context, enter RRC_IDLE, and perform a Registration Area Update. In addition, it has been agreed in Release 15 that if a UE is configured with MR-DC when entering RRC_INACTIVE, the UE will release the secondaryCellGroup configurations. In addition, if the UE is connected to E-UTRA/EPC or E-UTRA/5GCN either in single connectivity or in (NG)EN-DC when it is suspended to RRC_IDLE with suspended RRC Connection or RRC_INACTIVE respectively, when the UE initiates the RRC resume procedure it will also release the MCG SCell(s).

Note that, in NR, an equivalent message exists for the case of long Inactive Radio Network Temporary Identifier (I-RNTI) of 40 bits used as UE identifier RRCResumeRequest1 associated to a different logical channel compared to the short I-RNTI used in the RRCResumeRequest message.

Enhancements to RRC Resume Procedure in LTE/NR Release 16

In LTE/NR Release 16, a new Work Item (WI) for enhanced CA/DC operations is being standardized, and in the RAN2 #107 meeting (August 2019), it has been agreed that:

| Agreements |
|---|
| 1. The LTE RRCConnectionResume message (Inactive to Connected) can contain the MCG SCell configuration and the associated UE behaviour in handling the SCell configuration is the same as in the Rel-15 RRC connection reconfiguration procedure. |
| 2. In NR and LTE Rel-16, the UE maintains the MCG SCell configuration upon the initiation of the resume procedure. |
| 3. The RRC(Connection)Resume message contains an indication to restore/resume the MCG SCells (noting that behaviour in legacy eNBs that don't support this feature needs to be considered). |
| 4. The (LTE and NR) RRC(Connection)Resume (Inactive to Connected))message can contain the SCG configuration and the associated UE behaviour in handling the SCG configuration is the same as in the Rel-15 RRC (connection) reconfiguration procedure. |
| 5. In NR and LTE Rel-16, the UE maintains the SCG configuration upon the initiation of the resume procedure. |
| 6. The RRC(Connection)Resume message contains an indication to restore/resume the SCG (noting that behaviour in legacy e/gNBs that don't support this feature needs to be considered). |

These agreements mean that the SCG can be restored, released, or reconfigured during the resumption of an RRC connection. Specifically;

In case of resuming from RRC_INACTIVE in the case of EN-DC, NGEN-DC, NE-DC, or NR-DC, SCG can be restored, released, or reconfigured (either in a full or delta fashion).

In case of resuming from suspended RRC_IDLE connection in the case of EN-DC or NGEN-DC, SCG can be restored or released.

Synchronization and Random Access in LTE and NR

In LTE, whenever the UE performs a handover, it receives an RRCConnectionReconfiguration message that includes the mobilityControlInfo (see, e.g., Third Generation Partnership Project (3GPP) Technical Specification (TS) 36.331 V15.7.0). This contains all the configurations the UE requires to access the target cell and will trigger the UE to perform a random access to it, e.g., in order to obtain synchronization with the cell. Particularly, 3GPP TS 36.331 V15.7.0 states:

| 5.3.5.4 Reception of an RRCConnectionReconfiguration including the mobilityControlInfo by the UE (handover) |
|---|
| If the RRCConnectionReconfiguration message includes the mobilityControlInfo and the UE is able to comply with the configuration included in this message, the UE shall:<br>  <<skipped parts>><br>  1>start synchronising to the DL of the target PCell;<br>  <<skipped parts>><br>  1>reset MCG MAC and SCG MAC, if configured;<br>  <<skipped parts>> |

In case of a handover, the MAC, upon getting the RRCConnectionReconfigurationComplete message and noticing that it is the first time that it is sending data on this link, will initiate the random access procedure.

In case of LTE DC, the secondary radio configuration can contain a field called mobilityControlInfoSCG during SCG change or addition that has a similar functionality as the mobilityControlInfo field in the RRCConnectionReconfiguraiton, but for the SCG. As the UE does not transmit an RRCConnectionReconfigurationComplete directly to the SCG, as this message is only sent to the MCG, the procedures explicitly trigger a random access procedure for the SCG when the UE receives the mobilityControlInfoSCG.

Section 5.3.10.10 of 3GPP TS 36.331 V15.7.0 states:

| The UE shall:<br>  <<skipped parts>><br>  1>if scg-Configuration is received and is set to release or includes the<br>    mobilityControlInfoSCG (i.e. SCG release/ change):<br>  <<skipped parts>><br>    2>if scg-ConfigPartSCG is received and includes the mobilityControlInfoSCG (i.e. SCG<br>      change):<br>  <<skipped parts>><br>      3>start synchronising to the DL of the target PSCell;<br>      3>initiate the random access procedure on the PSCell, as specified in TS 36.321 [6],<br>        if rach-SkipSCG is not configured: |
|---|

In the case of NR, the cell group configuration, which can be either for the MCG or SCG, can contain the reconfigurationWithSync field that provides a similar functionality to the mobilityControlInfo and mobilityControlInfoSCG in LTE (3GPP TS 38.331 V15.7.0). Section 5.3.5.5.2 of 3GPP TS 38.331 V15.7.0 states:

| 5.3.5.5.2 Reconfiguration with sync |
|---|
| The UE shall the following actions to execute a reconfiguration with sync.<br>  1>if the AS security is not activated, perform the actions upon going to RRC_IDLE as<br>    specified in 5.3.11 with the release cause 'other' upon which the procedure ends;<br>  1>stop timer T310 for the corresponding SpCell, if running;<br>  1>start timer T304 for the corresponding SpCell with the timer value set to t304, as<br>    included in the reconfigurationWithSync;<br>  1>if the frequencyInfoDL is included:<br>    2>consider the target SpCell to be one on the SSB frequency indicated by the<br>      frequencyInfoDL with a physical cell identity indicated by the physCellId;<br>  1>else:<br>    2>consider the target SpCell to be one on the SSB frequency of the source SpCell with a<br>      physical cell identity indicated by the physCellId;<br>  1>start synchronising to the DL of the target SpCell;<br>  1>apply the specified BCCH configuration defined in 9.1.1.1;<br>  1>acquire the MIB, which is scheduled as specified in TS 38.213 [13];<br>  NOTE 1:  The UE should perform the reconfiguration with sync as soon as possible<br>        following the reception of the RRC message triggering the reconfiguration with<br>        sync, which could be before confirming successful reception (HARQ and ARQ) of<br>        this message.<br>  NOTE 2:  The UE may omit reading the MIB if the UE already has the required timing<br>        information, or the timing information is not needed for random access.<br>  1>reset the MAC entity of this cell group;<br>  1>consider the SCell(s) of this cell group, if configured, to be in deactivated state;<br>  1>apply the value of the newUE-Identity as the C-RNTI for this cell group;<br>  1>configure lower layers in accordance with the received spCellConfigCommon;<br>  1>configure lower layers in accordance with any additional fields, not covered in the<br>    previous, if included in the received reconfigurationWithSync. |

Section 5.3.5.3 of 3GPP TS 38.331 V15.7.0 states:

---

5.3.5.3 Reception of an RRCReconfiguration by the UE

---

The UE shall perform the following actions upon reception of the RRCReconfiguration:
<<skipped parts>>
1>if the RRCReconfiguration includes the secondaryCellGroup:
   2>perform the cell group configuration for the SCG according to 5.3.5.5; (NOTE: this
      calls the cell group configuration, that will call the reconfiguration with sycn
      procdure, if the reconfiguration with sync was included in the cell group)
1>if the RRCReconfiguration includes the mrdc-SecondaryCellGroupConfig:
   2>if the mrdc-SecondaryCellGroupConfig is set to setup:
      3>if the mrdc-SecondaryCellGroupConfig includes mrdc-ReleaseAndAdd:
         4>perform MR-DC release as specified in section 5.3.5.10;
      3>if the received mrdc-SecondaryCellGroup is set to nr-SCG:
         4>perform the RRC reconfiguration according to 5.3.5.3 for the
           RRCReconfiguration message included in nr-SCG;
      3>if the received mrdc-SecondaryCellGroup is set to eutra-SCG:
         4>perform the RRC connection reconfiguration as specified in TS 36.331 [10],
           clause 5.3.5.3 for the RRCConnectionReconfiguration message included in
           eutra-SCG;
   2>else (mrdc-SecondaryCellGroupConfig is set to release):
      3>perform MR-DC release as specified in section 5.3.5.10;
<<skipped parts>>
1>if the UE is configured with E-UTRA nr-SecondaryCellGroupConfig (MCG is E-UTRA,
   i.e. EN-DC case):
   2>if RRCReconfiguration was received via SRB1:
      3>submit the RRCReconfigurationComplete via the E-UTRA MCG embedded in E-
         UTRA RRC message RRCConnectionReconfigurationComplete as specified in TS
         36.331 [10];
      3>if reconfigurationWithSync was included in spCellConfig of an SCG:
         4>initiate the Random Access procedure on the SpCell, as specified in TS
           38.321 [3];
      3>else:
         4>the procedure ends;
   NOTE 1: The order the UE sends the RRCConnectionReconfigurationComplete message
      and performs the Random Access procedure towards the SCG is left to UE
      implementation.
   2>else (RRCReconfiguration was received via SRB3):
      3>submit the RRCReconfigurationComplete message via SRB3 to lower layers for
         transmission using the new configuration;
   NOTE 2: In (NG)EN-DC and NR-DC, in the case RRCReconfiguration is received via
      SRB1, the random access is triggered by RRC layer itself as there is not
      necessarily other UL transmission. In the case RRCReconfiguration is received via
      SRB3, the random access is triggered by the MAC layer due to arrival of
      RRCReconfigurationComplete .
1>else if RRCReconfiguration message was received within the nr-SCG within mrdc-
   SecondaryCellGroup (NR SCG RRC Reconfiguration, i.e. NR-DC case):
   2>if reconfigurationWithSync was included in spCellConfig in nr-SCG:
      3>initiate the Random Access procedure on the PSCell, as specified in TS 38.321
         [3];
   2>else
      3>the procedure ends;
<<skipped parts>>

Problems with Existing Solutions

There currently exist certain challenge(s). As mentioned above, it has been agreed to enable restoring, releasing, or reconfiguring a stored SCG configuration during connection resumption. However, there are several issues related to restoring, releasing, or reconfiguring a stored SCG configuration during connection resumption that need to be addressed.

SUMMARY

Systems and methods are disclosed herein for resuming a connection of a wireless communication device suspension to a dormant state while the wireless communication device was operating in Dual Connectivity (DC) with a Master Cell Group (MCG) with a first network node and a Secondary Cell Group (SCG) with a second network node. In one embodiment, a method performed by the wireless communication device comprises receiving a connection resume message with an indication to restore the SCG of the wireless communication device, where the connection resume message comprises information that is mandatory when the connection resume message comprises an indication to restore the SCG. The information that is mandatory comprises information that triggers synchronization and random access towards a Primary SCG Cell (PSCell) (e.g., reconfigurationWithSync or mobilityControlInfoSCG). The method further comprises restoring the SCG in accordance with the connection resume message. In this manner, the wireless device is able to properly restore the SCG because the resume message comprises the information used to trigger synchronization and random access towards the PSCell.

In one embodiment, the SCG is a New Radio (NR) SCG, and the information that is mandatory comprises reconfigurationWithSync. Further, in one embodiment, the MCG is either an NR MCG or an Evolved Universal Terrestrial Radio Access (E-UTRA) MCG.

In one embodiment, the SCG is an E-UTRA SCG, and the information that is mandatory comprises mobilityControlInfoSCG. Further, in one embodiment, the MCG is an NR MCG.

In one embodiment, the information that is mandatory comprises reconfigurationWithSync or mobilityControlInfoSCG, regardless of whether a stored SCG configuration is to be restored without reconfiguration.

In one embodiment, restoring the SCG comprises restoring a stored SCG configuration and initiating random access with a Primary SCG Cell (PSCell) of the restored SCG configuration.

In one embodiment, the connection resume message comprises a delta SCG configuration, and restoring the SCG comprises restoring a stored SCG configuration, applying the delta SCG configuration on top of the restored SCG configuration to provide an updated SCG configuration, and initiating random access with a PSCell of the updated SCG configuration.

In one embodiment, the connection resume message comprises a new SCG configuration, and restoring the SCG comprises applying the new SCG configuration and initiating random access with a PSCell of the new SCG configuration.

Corresponding embodiments of a wireless communication device are also disclosed. In one embodiment, a wireless communication device for resuming a connection after being suspended to a dormant state while the wireless communication device was operating in DC with an MCG with a first network node and an SCG with a second network node is adapted to receive a connection resume message with an indication to restore the SCG of the wireless communication device, where the connection resume message comprises information that is mandatory when the connection resume message comprises an indication to restore the SCG. The information that is mandatory comprises information that triggers synchronization and random access towards a PSCell (e.g., reconfigurationWithSync or mobilityControlInfoSCG). The wireless communication device is further adapted to restore the SCG in accordance with the connection resume message.

In one embodiment, a wireless communication device for resuming a connection after being suspended to a dormant state while the wireless communication device was operating in DC with an MCG with a first network node and an SCG with a second network node comprises one or more transmitters, one or more receivers, and processing circuitry associated with the one or more transmitters and the one or more receivers. The processing circuitry is configured to cause the wireless communication device to receive a connection resume message with an indication to restore the SCG of the wireless communication device, where the connection resume message comprises information that is mandatory when the connection resume message comprises an indication to restore the SCG. The information that is mandatory comprises information that triggers synchronization and random access towards a PSCell (e.g., reconfigurationWithSync or mobilityControlInfoSCG). The processing circuitry is further configured to cause the wireless communication device to restore the SCG in accordance with the connection resume message.

Embodiments of a method performed by a network node are also disclosed. In one embodiment, a method performed by a network node for resuming a connection of a wireless communication device after the wireless communication device was suspended to a dormant state while the wireless communication device was operating in DC with an MCG with a first network node and an SCG with a second network node comprises sending, to the wireless communication device, a connection resume message with an indication to restore the SCG of the wireless communication device. The connection resume message comprises information that is mandatory when the connection resume message comprises an indication to restore the SCG, where the information that is mandatory comprises information that triggers synchronization and random access towards a PSCell (e.g., reconfigurationWithSync or mobilityControlInfoSCG).

In one embodiment, the SCG is an NR SCG, and the information that is mandatory comprises reconfigurationWithSync. Further, in one embodiment, the MCG is either an NR MCG or an E-UTRA MCG.

In one embodiment, the SCG is an E-UTRA SCG, and the information that is mandatory comprises mobilityControlInfoSCG. Further, in one embodiment, the MCG is an NR MCG.

In one embodiment, the information that is mandatory comprises reconfigurationWithSync or mobilityControlInfoSCG, regardless of whether a stored SCG configuration is to be restored without reconfiguration.

In one embodiment, the network node is the first network node. In another embodiment, the network node is the second network node.

Corresponding embodiments of a network node are also disclosed. In one embodiment, a network node for resuming a connection of a wireless communication device after the wireless communication device was suspended to a dormant state while the wireless communication device was operating in DC with an MCG with a first network node and an SCG with a second network node is adapted to send, to the wireless communication device, a connection resume message with an indication to restore the SCG of the wireless communication device. The connection resume message comprises information that is mandatory when the connection resume message comprises an indication to restore the SCG, where the information that is mandatory comprises information that triggers synchronization and random access towards a PSCell (e.g., reconfigurationWithSync or mobilityControlInfoSCG).

In one embodiment, a network node for resuming a connection of a wireless communication device after the wireless communication device was suspended to a dormant state while the wireless communication device was operating in DC with an MCG with a first network node and an SCG with a second network node comprises processing circuitry configured to cause the network node to send, to the wireless communication device, a connection resume message with an indication to restore the SCG of the wireless communication device. The connection resume message comprises information that is mandatory when the connection resume message comprises an indication to restore the SCG, where the information that is mandatory comprises information that triggers synchronization and random access towards a PSCell (e.g., reconfigurationWithSync or mobilityControlInfoSCG).

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
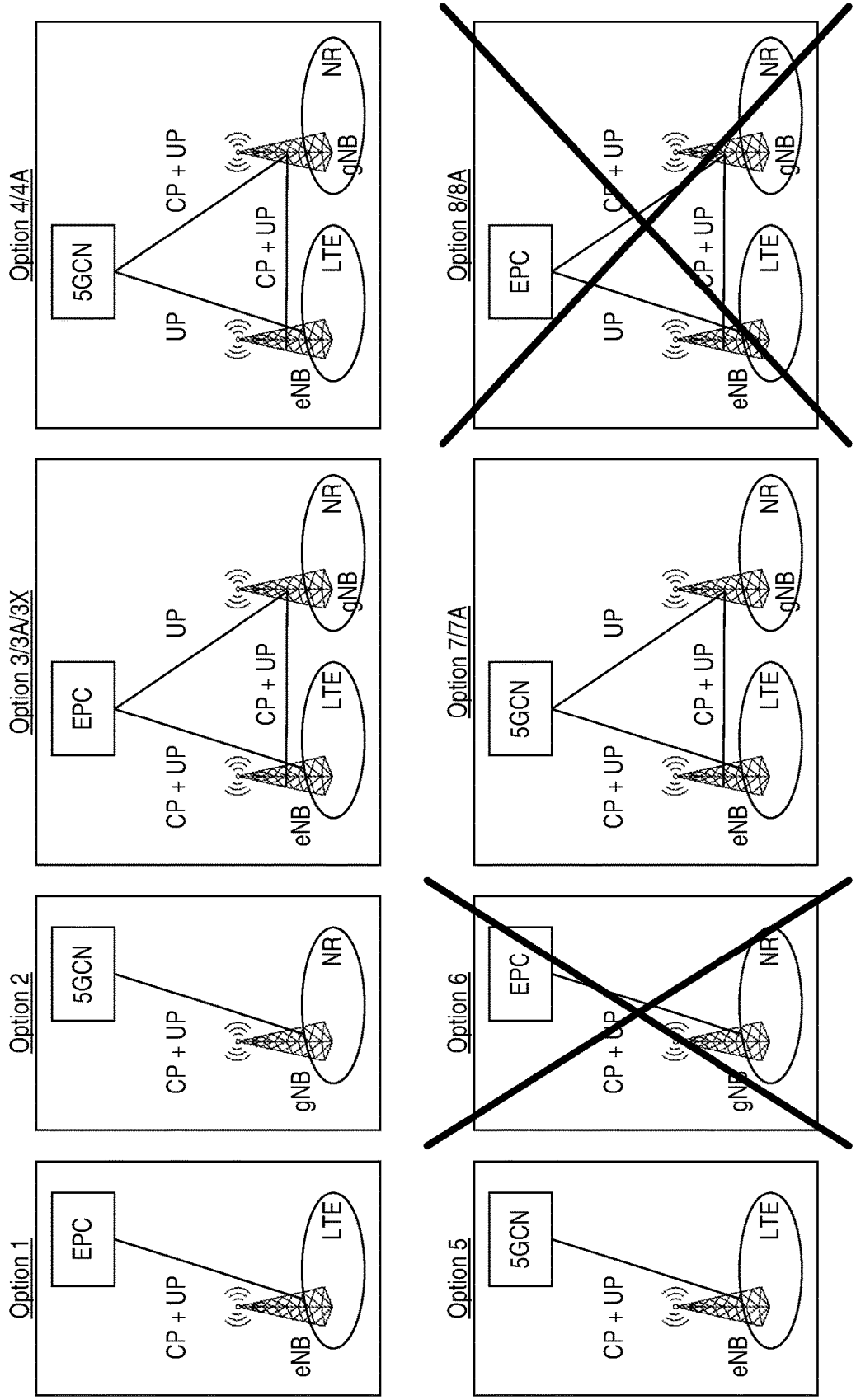
FIG. 1 illustrates different ways to deploy a Fifth Generation (5G) network with or without interworking with Long Term Evolution (LTE)
Figure 2:
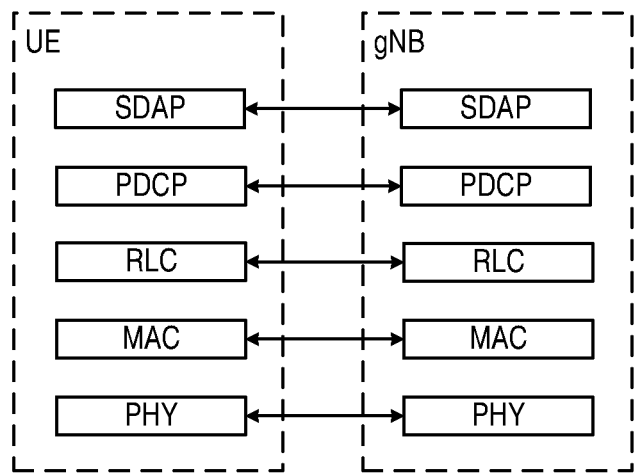
FIG. 2 illustrates the User Plane (UP) protocol stack in New Radio (NR)
Figure 3:
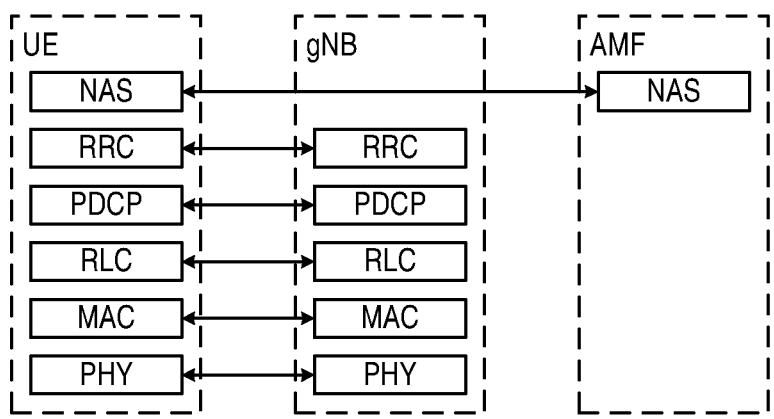
FIG. 3 illustrates the Control Plane (CP) protocol stack in NR.
Figure 4:
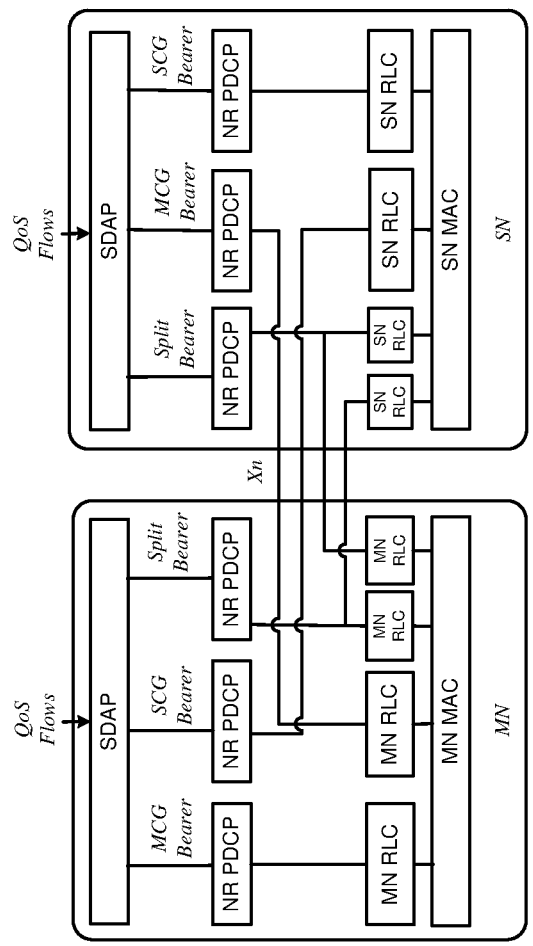
FIG. 4 illustrates network side protocol termination options for Master Cell Group (MCG), Secondary Cell Group (SCG), and split bearers in Multi-Radio (MR)-Dual Connectivity (DC), denoted MR-DC, with the Fifth Generation Core Network (5GCN)
Figure 5:
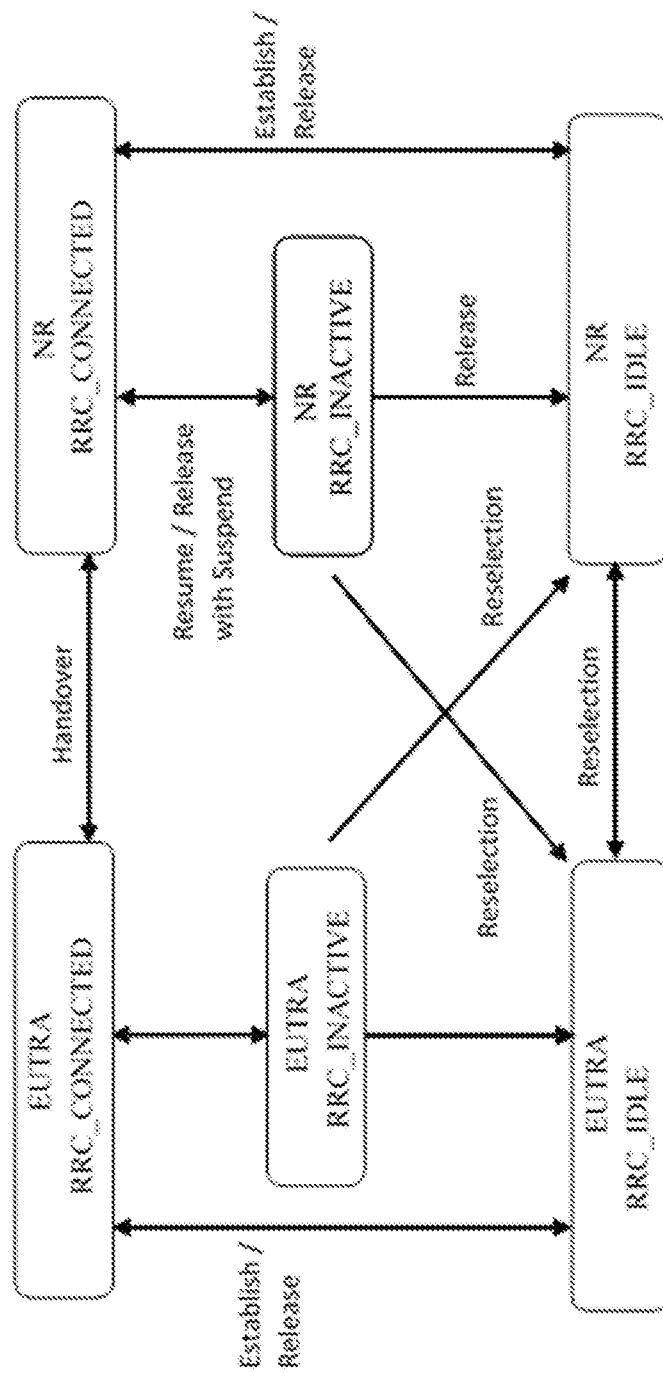
FIG. 5 illustrates User Equipment (UE) state machine and state transition between NR/5GCN, Evolved Universal Terrestrial Radio Access (E-UTRA)/Evolved Packet Core (EPC), and E-UTRA/5GCN.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Although the description herein refers to dual connectivity between Evolved Universal Terrestrial Radio Access (E-UTRA) and NR (E-UTRA NR Dual Connectivity (DC) (EN-DC), Next Generation RAN E-UTRA NR DC (NGEN-DC), NR E-UTRA DC (NE-DC)) or between two NR nodes (NR-DC), the solutions would be equally applicable in LTE DC (i.e., two E-UTRA nodes connected to an Evolved Packet Core (EPC) as specified in E-UTRA Release 13) or between two E-UTRA nodes connected to a 5G Core Network (5GCN) (currently not supported). Furthermore, if later releases support the UE to connect to more than two nodes, the same solutions would apply to resuming these additional connections.

There currently exist certain challenge(s). As mentioned above, it has been agreed to enable restoring, releasing, or reconfiguring a stored Secondary Cell Group (SCG) configuration during connection resumption. If the SCG is to be restored with no changes to the configurations, then there is no need to include the SCG configuration in the RRCResume message and a restore-SCG flag is sufficient to indicate to the UE that it has to restore the stored SCG configuration before the connection was suspended. This is discussed in previously filed U.S. Provisional Patent Application 62/805, 700 and is also described in detail in draft Change Requests (CRs) R2-1910262, R2-1910261.

As described above, the synchronization to the Primary SCG Cell (PSCell) and the initiation of the random access is triggered by either the inclusion of the mobilityControlInfoSCG if the SCG is LTE (in case of LTE-DC or NE-DC) or including the reconfigurationWithSync in the SCG cell group configuration if the SCG is NR (in case of EN-DC, NGEN-DC, and NR-DC).

If the SCG is to be restored during connection resumption, there is no need to include the SCG configuration. As such, the UE will not receive any mobilityControlInfoSCG or reconfigurationWithSync associated with the SCG. Thus, the UE will not be able to perform synchronization and the required random access towards the PSCell, which is required before the UE can start sending/receiving data to/from the SCG.

Certain aspects of the present disclosure and their embodiments may provide solutions to the aforementioned or other challenges.

Embodiments of method performed by a wireless communication device (e.g., a wireless terminal or UE) and corresponding embodiments of the wireless communication device are disclosed. In some embodiments, a method performed by a wireless communication device that is resuming a connection after being suspended to a dormant state (e.g., RRC_IDLE with suspended or RRC_INACTIVE) while it was operating in DC with a Master Cell Group (MCG) with a first node (the Master Node (MN)) and a SCG with a second node (the Secondary Node (SN)) is provided. In some embodiments, the method comprises:

receiving from a first node a connection resume message with an indication to resume both the MCG and the SCG;

upon detecting that no new configuration or no new delta configuration of the SCG is provided in the received connection resume message:
        restoring the stored SCG configuration;
        starting synchronization with the PSCell of the stored SCG configuration; and
        initiating the random access with the PSCell of the stored SCG connection; and upon detecting that a new configuration or a delta configuration of the SCG is provided in the received connection resume message:
        applying the new or delta SCG configuration, either on top of a restored SCG configuration or as a new SCG configuration;
        detecting that the received new or delta SCG configuration does not contain:
            ReconfigurationWithSync for an SCG, if the SCG configuration is an NR configuration; or
            MobilityControlInfoSCG, if the SCG configuration is an E-UTRA configuration;
        start synchronizing with the PSCell of the SN; and
        initiating the random access with the PSCell of the SN.

Note that, as understood by those of skill in the art, a "delta SCG configuration" or a "delta configuration of the SCG" is a configuration that includes only changes to the SCG configuration relative to a prior configuration of the SCG.

Embodiments of a method performed by a second network node (LTE eNB or NR gNB) and corresponding embodiments of the second network node are also disclosed. In some embodiments, the method performed by the second network node comprises:

receiving from a first network node an indication to resume the SCG for a wireless communication device (e.g., UE) which is suspended and was previously operating in DC with a master cell in a first node and a Secondary Cell (SCell) in the second network node.

Embodiments of a method performed by a second network node (LTE eNB or NR gNB) that was operating node as an SN for a wireless communication device (e.g., a UE) that was operating in DC with an MCG with a first node (the MN) and an SCG with the second node before it was suspended and corresponding embodiments of the second network node are also disclosed. In some embodiments, the method comprises:

receiving from the first network node an indication to resume the SCG;
    upon deciding that the old SCG configuration of the wireless communication device before suspension can be reused as is:
        sending an indication to the first network node that the SCG can be resumed as is;
    upon deciding that SCG configuration has to be modified (fully or in a delta fashion),
        sending to the first network node an SCG configuration that includes an indication for the UE to start synchronizing and initiate a random access procedure with the Primary Cell (PCell) of the secondary node (PSCell), wherein:
            if the second network node is operating in LTE, the indication is a mobilityControlInfoSCG, and
            if the second network node is operating in NR, the indication is a reconfigurationWithSync; and
    receiving a random access request from the wireless communication device; and
    sending a random access response to the wireless communication device and resume the connection with the wireless communication device.

Note that, in the wireless communication device embodiments above, it has been assumed that the wireless communication device may receive a delta or full SCG configuration that does not include a mobilityControlInfoSCG or reconfigurationWithSync, and the reception of the resume message with the SCG configuration was used as an implicit indication for the wireless communication device to trigger the synchronization and random access procedure with the SN. However, an alternate solution is to ensure that the SN always includes the mobilityControlInfoSCG or the reconfigurationWithSync whenever it provides a delta or new SCG configuration as a response to the message from the MN to resume the SCG. The first option is what is bolded in the wireless communication device embodiments above, while the second option is what is bolded in the SN embodiments above.

Certain embodiments may provide one or more of the following technical advantage(s). Without this present disclosure, it will not be possible to properly resume the stored SCG because the UE will not get an indication (i.e., a mobilityControlInfoSCG if the SCG was E-UTRA or a reconfigurationWithSync if the SCG was NR) to trigger the synchronization and the random access procedure towards the PSCell.

Figure 6:
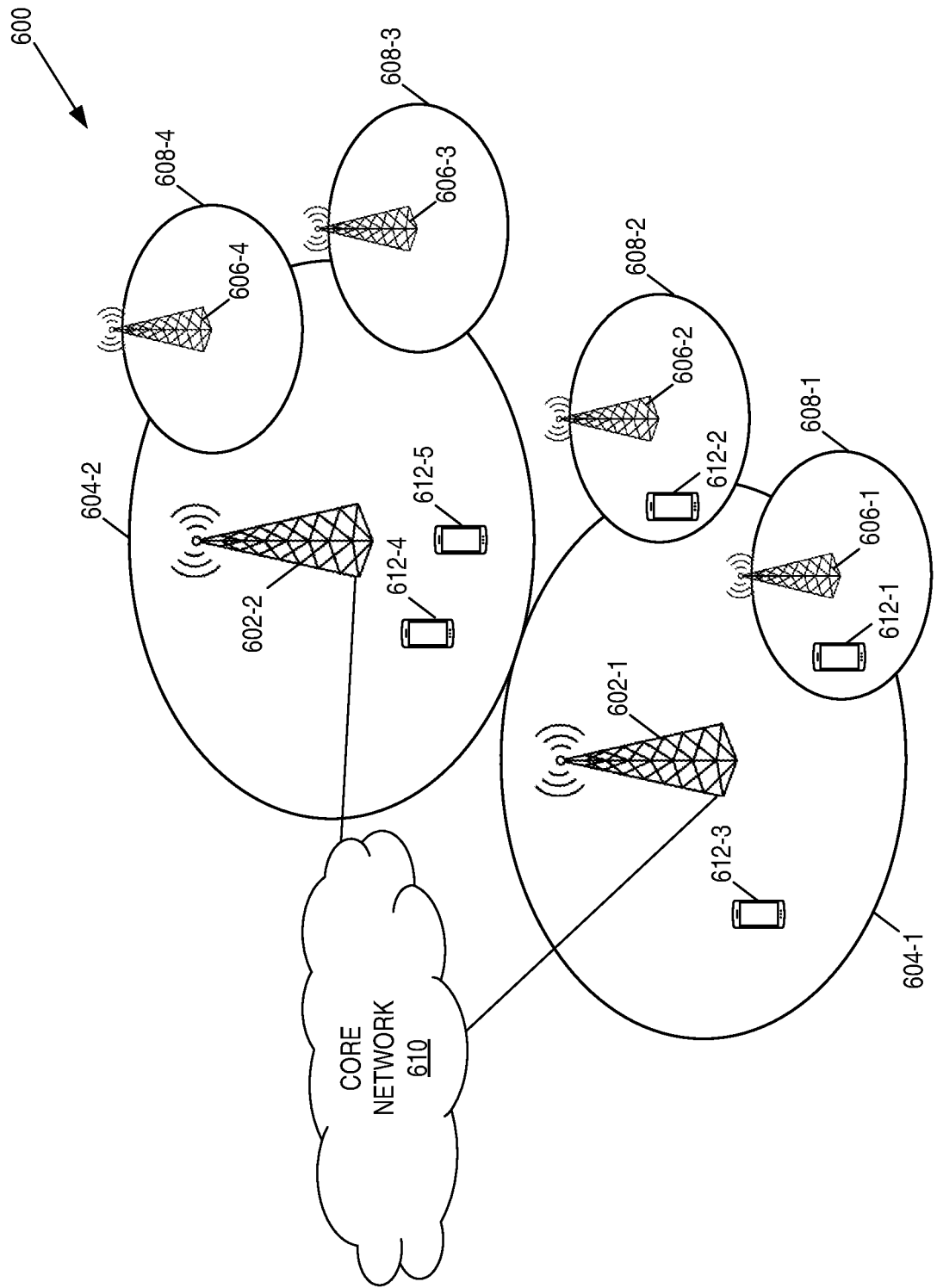
FIG. 6 illustrates one example of a cellular communications system in which embodiments of the present disclosure may be implemented.

FIG. 6 illustrates one example of a cellular communications system 600 in which embodiments of the present disclosure may be implemented. In the embodiments described herein, the cellular communications system 600 is a 5G System (5GS) including an NR RAN or a system that includes a mixture of LTE and NR RAN nodes. In this example, the RAN includes base stations 602-1 and 602-2, which in in LTE are referred to as eNBs and in 5G NR are referred to as gNBs or next generation eNBs (ng-eNBs) in the case of LTE RAN nodes connected to the 5GCN, controlling corresponding (macro) cells 604-1 and 604-2. The base stations 602-1 and 602-2 are generally referred to herein collectively as base stations 602 and individually as base station 602. Likewise, the (macro) cells 604-1 and 604-2 are generally referred to herein collectively as (macro) cells 604 and individually as (macro) cell 604. The RAN may also include a number of low power nodes 606-1 through 606-4 controlling corresponding small cells 608-1 through 608-4. The low power nodes 606-1 through 606-4 can be small base stations (such as pico or femto base stations) or Remote Radio Heads (RRHs), or the like. Notably, while not illustrated, one or more of the small cells 608-1 through 608-4 may alternatively be provided by the base stations 602. The low power nodes 606-1 through 606-4 are generally referred to herein collectively as low power nodes 606 and individually as low power node 606. Likewise, the small cells 608-1 through 608-4 are generally referred to herein collectively as small cells 608 and individually as small cell 608. The cellular communications system 600 also includes a core network 610. The base stations 602 (and optionally the low power nodes 606) are connected to the core network 610.

The base stations 602 and the low power nodes 606 provide service to wireless communication devices 612-1 through 612-5 in the corresponding cells 604 and 608. The wireless communication devices 612-1 through 612-5 are generally referred to herein collectively as wireless communication devices 612 and individually as wireless communication device 612. In the following description, the wireless communication devices 612 are oftentimes UEs, but the present disclosure is not limited thereto.

Figure 7:
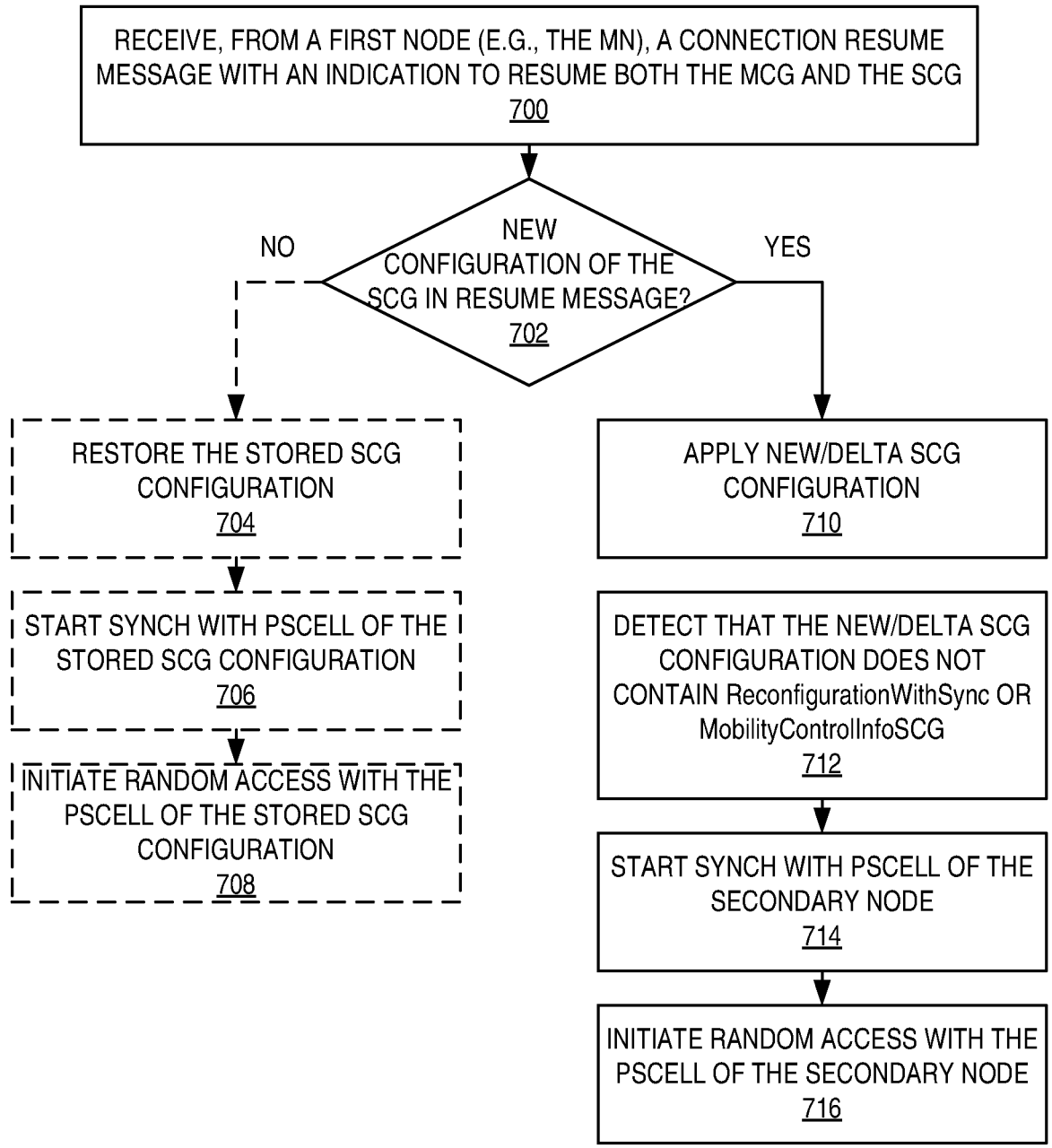
FIG. 7 is a flow chart that illustrates a method performed by a wireless communication device (e.g., a wireless terminal or UE) in accordance with some embodiments of the present disclosure.

FIG. 7 is a flow chart that illustrates a method performed by a wireless communication device 612 (e.g., a wireless terminal or UE) in accordance with some embodiments of the present disclosure. Optional steps are represented by dashed lines/boxes. In this embodiment, the wireless communication device 612 is resuming a connection after being suspended to a dormant state (e.g., RRC_IDLE with suspended or RRC_INACTIVE) while it was operating in DC with a MCG with a first node (the MN) and a SCG with a second node (the SN). As illustrated, the method includes the following steps.

Step 700: The wireless communication device 612 receives, from the first node (the MN), a connection resume message with an indication to resume both the MCG and the SCG.

Step 702: The wireless communication device 612 determines whether a new configuration or a new delta configuration of the SCG is provided in the received connection resume message.

Steps 704-708: Upon detecting that no new configuration or no new delta configuration of the SCG is provided in the received connection resume message, the wireless communication device 612:
  restores the stored SCG configuration (step 704),
  starts synchronization with the PSCell of the stored SCG configuration (step 706), and
  initiates random access with the PSCell of the stored SCG connection (step 708).

Steps 710-716: Upon detecting that a new configuration or a delta configuration of the SCG is provided in the received connection resume message, the wireless communication device 612:
  applies the new or delta SCG configuration, either on top of a restored SCG configuration or as a new SCG configuration (step 710);
  detects (step 712) that the received new or delta SCG configuration does not contain:
    *ReconfigurationWithSync* ReconfigurationWithSync for an SCG, if the SCG configuration is an NR configuration; or
    *MobilityControlInfoSCG*, if the SCG configuration is an E-UTRA configuration;
  starts synchronizing with the PSCell of the SN (step 714); and
  initiates random access with the PSCell of the SN (step 716).

Figure 8:
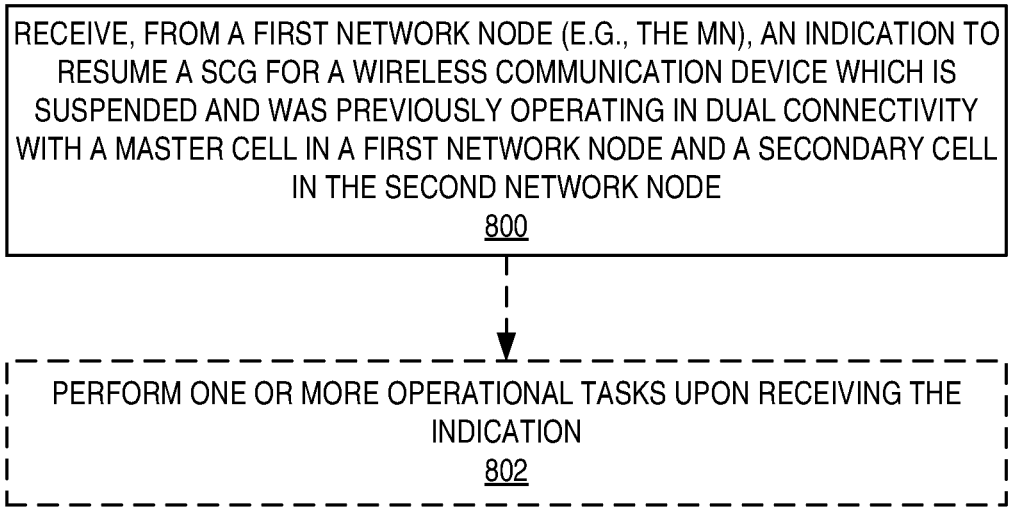
FIG. 8 is a flow chart that illustrates a method performed by a network node (e.g., a base station or other Radio Access Network (RAN) node) that serves as the Secondary Node (SN) of an SCG of a wireless communication device in accordance with some embodiments of the present disclosure.

FIG. 8 is a flow chart that illustrates a method performed by a second network node (e.g., a base station 602 or other RAN node (e.g., a LTE eNB or NR gNB) that serves as the SN of an SCG of a wireless communication device 612 (e.g., a wireless terminal or UE)) in accordance with some embodiments of the present disclosure. Optional steps are represented by dashed lines/boxes. In this embodiment, the method performed by the second network node comprises:

Step 800: The second network node receives, from a first network node, an indication to resume an SCG for a wireless communication device (e.g., UE) which is suspended and was previously operating in DC with a master cell in a first node (e.g., in the first network node) and a SCell in the second network node.

Step 802 (optional): The second network node performs one or more operational tasks upon receiving the indication.

Figure 9:
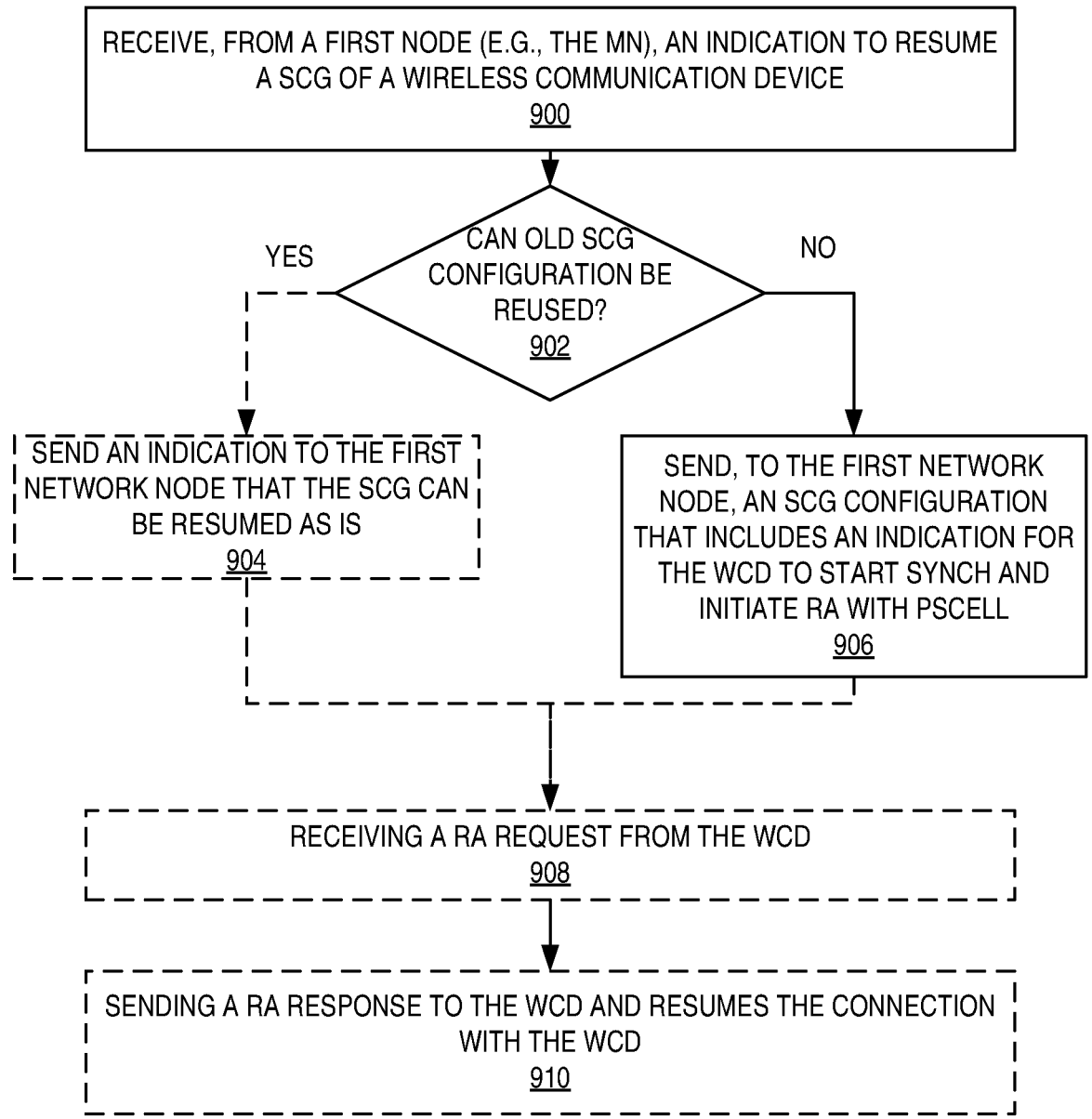
FIG. 9 is a flow chart that illustrates a method performed by a network node (e.g., a base station or other RAN node) that serves as the SN for a wireless communication device that was operating in DC with an MCG with a first node (the Master Node (MN)) and an SCG with the SN before it was suspended in accordance with some embodiments of the present disclosure.

FIG. 9 is a flow chart that illustrates a method performed by a second network node (e.g., a base station 602 or other RAN node (e.g., an LTE eNB or NR gNB) that serves as the SN for a wireless communication device 612 (e.g., a UE) that was operating in DC with an MCG with a first node (the MN) and an SCG with the second network node before it was suspended in accordance with some embodiments of the present disclosure. In this embodiment, the method performed by the second network node comprises:

Step 900: The second network node receives, from the first network node, an indication to resume the SCG.

Step 902: The second network node determines whether the old SCG configuration of the wireless communication device 612 before suspension can be reused as is.

Step 904: Upon deciding that the old SCG configuration of the wireless communication device before suspension can be reused as is, the second network node sends an indication to the first network node that the SCG can be resumed as is.

Step 906: Upon deciding that SCG configuration has to be modified (fully or in a delta fashion), sending to the first network node an SCG configuration that includes an indication for the UE to start synchronizing and initiate a random access procedure with the PCell of the SN (PSCell), wherein if the second network node is operating in LTE, the indication is a *mobilityControlInfoSCG*, and if the second network node is operating in NR, the indication is a *reconfigurationWithSync;* and Step 908: The second network node receives a random access request from the wireless communication device.

Step 910: The second network node sends a random access response to the wireless communication device and resumes the connection with the wireless communication device.

Note that, in the wireless communication device embodiments above, it has been assumed that the wireless communication device may receive a delta or full SCG configuration that doesn't include a mobilityControlInfoSCG or reconfigurationWithSync, and the reception of the resume message with the SCG configuration was used as an implicit indication for the wireless communication device to trigger the synchronization and random access procedure with the SN. However, an alternate solution is to ensure that the SN always includes the mobilityControlInfoSCG or the reconfigurationWithSync whenever it provides a delta or new SCG configuration as a response to the message from the MN to resume the SCG. The first option is what is bolded in the wireless communication device embodiments above, while the second option is what is bolded in the SN embodiments above.

Resuming SCG when the MN is Running in LTE

In the following, example realizations of embodiments of the present disclosure during resuming a UE that was operating in EN-DC or NGEN-DC (3GPP Technical Specification (TS) 36.331) are provided. Text marked in bold font are changes required to enable MCG SCell/SCG resumption that is currently being captured in 3GPP (i.e., exact phrasing not agreed yet). Text marked in bold font and underlined are required changes that are specific to this embodiment of the solution described herein (i.e., synchronization and random access towards the SCG). The example realizations are shown as example specification text that could be included into 3GPP TS 36.331.

---

5.3.3.4a Reception of the RRCConnectionResume by the UE

---

The UE shall:
1>stop timer T300;
1>if T309 is running:
   2>stop timer T309 for all access categories;
   2>perform the actions as specified in 5.3.16.4.
1>stop T380 if running;
1>except if the RRCConnectionResume is received in response to an RRCConnectionResumeRequest for EDT:
   2>**if the *RRCConnectionResume* message does not include the *restoreMCG-SCells*:**
      3>release the MCG SCell(s), if configured, in accordance with 5.3.10.3a;
   2>**if the *RRCConnectionResume* message does not include the *restoreSCG*:**
      3>if the UE is in (NG)EN-DC:
         4>perform MR-DC release, as specified in TS 38.331 [82], clause 5.3.5.10;
   2>if resuming an RRC connection from a suspended RRC connection:
      3>restore the PDCP state and re-establish PDCP entities for SRB2, if configured with E-UTRA PDCP, and for all DRBs that are configured with E-UTRA PDCP;
      3>if drb-ContinueROHC is included:
         4>indicate to lower layers that stored UE AS context is used and that drb-ContinueROHC is configured;
         4>continue the header compression protocol context for the DRBs configured with the header compression protocol;
      3>else:
         4>indicate to lower layers that stored UE AS context is used;
         4>reset the header compression protocol context for the DRBs configured with the header compression protocol;
      3>discard the stored UE AS context and resumeIdentity;
   2>else if the RRCConnectionResume message includes the fullConfig (for resuming an RRC connection from RRC_INACTIVE):
      3>perform the radio configuration procedure as specified in 5.3.5.8;
   2>else (for resuming an RRC connection from RRC_INACTIVE):
      3>restore the physical layer configuration, the MAC configuration, the RLC configuration and the PDCP configuration from the stored UE Inactive AS context;
      3>if drb-ContinueROHC is included:
         4>indicate to lower layers that drb-ContinueROHC is configured;
      3>discard the stored UE Inactive AS context;
      3>release the rrc-InactiveConfig, except ran-NotificationAreaInfo;
1>else:
   2>discard the stored UE AS context and resumeIdentity;
1>perform the radio resource configuration procedure in accordance with the received radioResourceConfigDedicated and as specified in 5.3.10;

| 5.3.3.4a Reception of the RRCConnectionResume by the UE |
|---|

1> NOTE 1: When performing the radio resource configuration procedure, for the physical layer configuration and the MAC Main configuration, the restored RRC configuration from the stored UE AS context is used as basis for the reconfiguration.
1>if the received RRCConnectionResume message includes the sk-Counter:
  2>perform key update procedure as specified in TS 38.331 [82], clause 5.3.5.8;
1>if the received RRCConnectionResume message includes the nr-RadioBearerConfig1:
  2>perform radio bearer configuration as specified in TS 38.331 [82], clause 5.3.5.6;
1>if the received RRCConnectionResume message includes the nr-RadioBearerConfig2:
  2>perform radio bearer configuration as specified in TS 38.331 [82], clause 5.3.5.6;
1>**if the received *RRCConnectionResume* includes the *sCellToReleaseList* :**
  2>perform SCell release as specified in 5.3.10.3a;
1>**if the received *RRCConnectionResume* includes the *sCellToAddModList* :**
  2>perform SCell addition or modification as specified in 5.3.10.3b;
1>**if the received *RRCConnectionResume* message includes the *nr-SecondaryCellGroupConfig*:**
  2>perform NR RRC Reconfiguration as specified in TS 38.331 [82], clause 5.3.5.3;
1>**else, if the *RRCConnectionResume* includes the *restoreSCG* (i.e. only restoring stored SCG):**
  2>start synchronising to the DL of the target PSCell;
  2>apply the specified BCCH configuration defined in 9.1.1.1;
  2>**acquire the *MIB*, which is scheduled as specified in TS 38.213 [13];**
  **NOTE : The UE may omit reading the *MIB* if the UE already has the required timing information, or the timing information is not needed for random access.**
  1>consider the SCell(s) of SCG, if configured, to be in deactivated state as specified in TS 38.331 [82];
  2>initiate the Random Access procedure on the PSCell, as specified in TS 38.321 [ref];
1>except if the RRCConnectionResume is received in response to an RRCConnectionResumeRequest for EDT:
  2>resume SRB2 and all DRBs, if any, including RBs configured with NR PDCP;
    <<skipped parts>>
1>enter RRC_CONNECTED;
1>indicate to upper layers that the suspended RRC connection has been resumed;
1>stop the cell re-selection procedure;
1>consider the current cell to be the PCell;
1>set the content of RRCConnectionResumeComplete message as follows:
    <<skipped parts>>
  2>**if the received *RRCConnectionResume* message included *nr-SecondaryCellGroupConfig*:**
    3>**include *scg-ConfigResponseNR* in accordance with TS 38.331 [82], clause 5.3.5.3;**
<<skipped parts>>
1>submit the RRCConnectionResumeComplete message to lower layers for transmission;
1>the procedure ends.

Resuming SCG when the Master Node is Running in NR

In the following, example realizations of the embodiments of the present disclosure during resuming a UE that was operating in NR-DC or NE-DC (3GPP TS 38.331) are provided. Text marked in bold font are changes required to enable MCG SCell/SCG resumption that is currently being captured in 3GPP (i.e., exact phrasing not agreed yet). Text marked in bold font and underlined are changes that are specific to this embodiment of the solution described herein (i.e., synchronization and random access towards the SCG). The example realizations are shown as example specification text that could be included into 3GPP TS 38.331.

| 5.3.13.4 Reception of the RRCResume by the UE |
|---|

The UE shall:
  1>stop timer T319;
  1>stop timer T380, if running;
  1>if the RRCResume includes the fullConfig:
    2>perform the full configuration procedure as specified in 5.3.5.11;
  1>else:
    2>**if the *RRCResume* does not include the *restoreMCG-SCells* :**
      3>release the MCG SCell(s) from the UE Inactive AS context, if stored;
    2>restore the masterCellGroup and pdcp-Config from the UE Inactive AS context;
  1>discard the UE Inactive AS context;
  1>release the suspendConfig except the ran-NotificationAreaInfo;
  1>**if the *RRCResume* does not include the *restoreSCG* :**
    2>if the UE is in NE-DC or NR-DC:
      3>perform MR-DC release, as specified in clause 5.3.5.10;

| 5.3.13.4 Reception of the RRCResume by the UE |
|---|

1>if the RRCResume includes the masterCellGroup:
  2>perform the cell group configuration for the received masterCellGroup according to
    5.3.5.5;
1>if the RRCResume includes the radioBearerConfig:
  2>perform the radio bearer configuration according to 5.3.5.6;
1>if the RRCResume message includes the sk-Counter:
  2>perform security key update procedure as specified in 5.3.5.7;
1>if the RRCResume message includes the radioBearerConfig2:
  2>perform the radio bearer configuration according to 5.3.5.6;
1>**if the RRCResume includes the *mrdc-SecondaryCellGroup* :**
  2>**if the received *mrdc-SecondaryCellGroup* is set to *nr-SCG* :**
    3>perform the RRC reconfiguration according to 5.3.5.3 for the
      ***RRCReconfiguration* message included in nr-SCG;**
  2>**if the received *mrdc-SecondaryCellGroup* is set to *eutra-SCG* :**
    3>perform the RRC connection reconfiguration as specified in TS 36.331 [10],
      **clause 5.3.5.3 for the *RRCConnectionReconfiguration* message included in**
      ***eutra-SCG* ;**
1>**else, if the *RRCResume* includes the *restoreSCG* :**
  2>if the UE is in NR-DC:
    3>start synchronising to the DL of the target PSCell;
    3>apply the specified BCCH configuration defined in 9.1.1.1;
    3>**acquire the *MIB*, which is scheduled as specified in TS 38.213 [13];**
    **NOTE:   The UE may omit reading the *MIB* if the UE already has the**
      required timing information, or the timing information is not needed for
      random access.
    1>consider the SCell(s) of SCG, if configured, to be in deactivated state;
    3>initiate the Random Access procedure on the PSCell, as specified in TS 38.321
      [ref];
  2>else (the UE is in NE-DC)
    3>start synchronising to the DL of the target PSCell;
    3>consider the SCell(s) of the SCG, if configured, to be in deactivated state as
      specified in TS 36.331 [10];
    3>initiate the Random Access procedure on the PSCell, as specified in TS 36.321
      [ref];
1>resume SRB2 and all DRBs;
1>if stored, discard the cell reselection priority information provided by the
  cellReselectionPriorities or inherited from another RAT;
1>stop timer T320, if running;
1>if the RRCResume message includes the measConfig:
  2>perform the measurement configuration procedure as specified in 5.5.2;
1>resume measurements if suspended;
1>if T390 is running:
  2>stop timer T390 for all access categories;
  2>perform the actions as specified in 5.3.14.4;
1>if T302 is running:
  2>stop timer T302;
  2>perform the actions as specified in 5.3.14.4;
1>enter RRC_CONNECTED;
1>indicate to upper layers that the suspended RRC connection has been resumed;
1>stop the cell re-selection procedure;
1>consider the current cell to be the PCell;
1>set the content of the of RRCResumeComplete message as follows:
  2>if the upper layer provides NAS PDU, set the dedicatedNAS-Message to include the
    information received from upper layers;
  2>if the upper layer provides a PLMN, set the selectedPLMN-Identity to PLMN selected
    by upper layers (TS 24.501 [23]) from the PLMN(s) included in the plmn-IdentityList
    in SIB1;
  2>if the masterCellGroup contains the reportUplinkTxDirectCurrent:
    3>include the uplinkTxDirectCurrentList for each serving cell with UL;
    3>if UE is configured with SUL carrier:
      4>include uplinkDirectCurrentBWP-SUL for each serving cell with SUL within
        the uplinkTxDirectCurrentList;
  2>if the UE has IDLE mode measurement information available in VarMeasIdleReport:
    3>if the idleModeMeasurementReq is included in the RRCResume message:
      4>set the measResultListIdle in the RRCResumeComplete message to the value of
        measReportIdle in the VarMeasIdleReport;
    3>else, if the SIB1 contains idleModeMeasurements:
      4>include the idleMeasAvailable;
  2>**if the RRCResume message includes the *mrdc-SecondaryCellGroupConfig* with**
    ***mrdc-SecondaryCellGroup* set to *eutra-SCG* :**
    3>**include in the *eutra-SCG-Response* the E-UTRA**
      ***RRCConnectionReconfigurationComplete* message in accordance with TS**
      36.331 [10] clause 5.3.5.3;

| 5.3.13.4 Reception of the RRCResume by the UE |
| --- |
| 2>if the *RRCResume* message includes the *mrdc-SecondaryCellGroupConfig* with *mrdc-SecondaryCellGroup* set to *nr-SCG*:<br>   3>include in the *nr-SCG-Response* the SCG *RRCReconfigurationComplete* message;<br>1>submit the RRCResumeComplete message to lower layers for transmission;<br>1>the procedure ends. |

Other Enhancements

Embodiments discussed herein include methods to handle the UE synchronizing with the SCG and initiating random access even if the mobilityControlInfoSCG or the reconfigurationWithSync, which are normally used to trigger these actions, are not present, which is the case if the UE is instructed to restore the SCG without any delta or full configuration of the SCG.

If the UE is provided with an SCG configuration and the mobilityControlInfoSCG or the reconfigurationWithSync are not included, the problem still remains. Here, new conditions to be included in the specifications regarding these fields are proposed so that it can be ensured that a UE will always receive the mobilityControlInfoSCG or reconfigurationWithSync if it receives an SCG configuration with the resume message.

For NE-DC (NR MN, E-UTRA SN), the NR RRCReconfiguration message will contain the E-UTRA RRCConnectionReconfiguration message comprising the SCG configurations. The NR RRCReconfiguration message will contain the field mrdc-SecondaryCellGroupConfig. This in turn will contain the field mrdc-SecondaryCellGroup with the choice set to eutra-SCG. This field will contain an E-UTRA RRCConnectionReconfiguration message. This RRCConnectionReconfiguration message will contain the Information Element (IE) SCG-Configuration, which in turn will contain the field SCG-ConfigPartSCG. This field will in turn contain the field mobilityControlInfoSCG. In some embodiments, the required change proposed herein is to make this field mandatory in case of NE-DC resume when NR RRCResume message includes the E-UTRA RRCConnectionReconfiguration message for the SCG. The NR and E-UTRA messages are shown below with the relevant parts highlighted in in bold font. The required changes are highlighted in in bold font and underlined.

```
RRCReconfiguration-v1560-IEs ::=              SEQUENCE {
    mrdc-SecondaryCellGroupConfig                 SetupRelease {
    MRDC-SecondaryCellGroupConfig }                   OPTIONAL,
    -- Need M
    radioBearerConfig2                            OCTET STRING
    (CONTAINING RadioBearerConfig)                    OPTIONAL,
    -- Need M
    sk-Counter                                    SK-Counter
    OPTIONAL,  -- Need N
    nonCriticalExtension                          SEQUENCE { }
    OPTIONAL
}
MRDC-SecondaryCellGroupConfig ::=             SEQUENCE {
    mrdc-ReleaseAndAdd                            ENUMERATED {true}
    OPTIONAL,  -- Need N
    mrdc-SecondaryCellGroup                       CHOICE {
        nr-SCG                                        OCTET STRING
        (CONTAINING RRCReconfiguration),
        eutra-SCG                                     OCTET STRING
    }
}
-   RRCConnectionReconfiguration
        RRCConnectionReconfiguration message
-- ASN1START
RRCConnectionReconfiguration ::=              SEQUENCE {
    rrc-TransactionIdentifier                     RRC-TransactionIdentifier,
    criticalExtensions                            CHOICE {
        c1                                            CHOICE{
            rrcConnectionReconfiguration-r8
            RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture                      SEQUENCE { }
    }
}
<<omitted parts>>
RRCConnectionReconfiguration-v1250-IEs ::= SEQUENCE {
    wlan-OffloadInfo-r12                          CHOICE {
        release                                       NULL,
        setup                                         SEQUENCE {
            wlan-OffloadConfigDedicated-r12               WLAN-OffloadConfig-r12,
```

```
        t350-r12                          ENUMERATED {min5, min10,
min20, min30, min60,
                                          min120, min180, spare1}
        OPTIONAL    -- Need OR
    }
}                                         OPTIONAL,   --
Need ON
    scg-Configuration-r12                 SCG-Configuration-r12
    OPTIONAL,   -- Cond nonFullConfig
    sl-SyncTxControl-r12                  SL-SyncTxControl-r12
    OPTIONAL,   -- Need ON
    sl-DiscConfig-r12                     SL-DiscConfig-r12
    OPTIONAL,   -- Need ON
    sl-CommConfig-r12                     SL-CommConfig-r12
    OPTIONAL,   -- Need ON
    nonCriticalExtension                  RRCConnectionReconfiguration-
v1310-IEs OPTIONAL
}
<<omitted parts>>
SCG-Configuration-r12 ::=                 CHOICE {
    release                     NULL,
    setup                       SEQUENCE {
        scg-ConfigPartMCG-r12                 SEQUENCE {
            scg-Counter-r12                       INTEGER (0.. 65535)
    OPTIONAL,   -- Need ON
            powerCoordinationInfo-r12             PowerCoordinationInfo-
r12   OPTIONAL,   -- Need ON
            ...
        }                                     OPTIONAL,   --
Need ON
        scg-ConfigPartSCG-r12                 SCG-ConfigPartSCG-r12
        OPTIONAL   -- Need ON
    }
}
<<omitter parts>>
SCG-ConfigPartSCG-r12 ::=                 SEQUENCE {
    radioResourceConfigDedicatedSCG-r12
    RadioResourceConfigDedicatedSCG-r12               OPTIONAL,   -- Need ON
    sCellToReleaseListSCG-r12             SCellToReleaseList-r10
    OPTIONAL,   -- Need ON
    pSCellToAddMod-r12                    PSCellToAddMod-r12
    OPTIONAL,   -- Need ON
    sCellToAddModListSCG-r12              SCellToAddModList-r10
    OPTIONAL,   -- Need ON
    mobilityControlInfoSCG-r12            MobilityControlInfoSCG-r12
    OPTIONAL,   -- Cond SCG-Resume
    ... ,
    [[
    sCellToReleaseListSCG-Ext-r13         SCellToReleaseListExt-r13
        OPTIONAL,   -- Need ON
    sCellToAddModListSCG-Ext-r13          SCellToAddModListExt-r13
        OPTIONAL   -- Need ON
    ]],
    [[
    sCellToAddModListSCG-Ext-v1370        SCellToAddModListExt-v1370
    OPTIONAL   -- Need ON
    ]],
    [[
    pSCellToAddMod-v1440                  PSCellToAddMod-v1440
    OPTIONAL   -- Need ON
    ]],
    [[ sCellGroupToReleaseListSCG-r15     SCellGroupToReleaseList-
r15   OPTIONAL,   -- Need ON
        sCellGroupToAddModListSCG-r15 SCellGroupToAddModList-r15
    OPTIONAL   -- Need ON
    ]],
    [[ -- NE-DC addition for setup/ modification and release SN
configured measurements
        measConfigSN-r15                      MeasConfig
    OPTIONAL,   -- Need ON
        -- NE-DC additions concerning DRBs/ SRBs are within
RadioResourceConfigDedicatedSCG
        tdm-PatternConfigNE-DC-r15            TDM-PatternConfig-r15
    OPTIONAL   -- Cond FDD-PSCell
    ]],
```

```
[[ p-MaxEUTRA-r15           P-Max              OPTIONAL
-- Need ON
 ]]
}
<<omitted parts >>
-- ASN1STOP
```

| Conditional presence | Explanation |
|---|---|
| EARFCN-max | The field is mandatory present if dl-CarrierFreq-r10 is included and set to maxEARFCN. Otherwise the field is not present. |
| FDD-PCell | This field is optionally present, need ON, for a FDD PCell if there is no SCell with configured uplink. Otherwise, the field is not present. |
| FDD-PSCell | This field is optionally present, need ON, for a FDD PSCell if there is no SCell with configured uplink. Otherwise, the field is not present. |
| fullConfig | This field is mandatory present for handover within E-UTRA when the fullConfig is included; otherwise it is optionally present, Need OP. |
| HO | The field is mandatory present in case of handover within E-UTRA or to E-UTRA; otherwise the field is not present. |
| HO-Reestab | The field is mandatory present in case of inter-system handover within E-UTRA or handover from NR to E-UTRA/EPC; it is optionally present, need ON, in case of intra-system handover within E-UTRA or upon the first reconfiguration after RRC connection re-establishment; or for intra-system handover from NR to E-UTRA, otherwise the field is not present. |
| HO-5GC | The field is mandatory present in case of handover within E-UTRA/5GC, handover to E-UTRA/5GC, handover from NR to E-UTRA/EPC, or handover from E-UTRA/5GC to E-UTRA/EPC, otherwise the field is not present. |
| HO-toEPC | The field is mandatory present in case of handover within E-UTRA/EPC or to E-UTRA/EPC, except handover from NR or E-UTRA/5GC, otherwise the field is not present. |
| HO-toEUTRA | The field is mandatory present in case of handover to E-UTRA or for reconfigurations when fullConfig is included; otherwise the field is optionally present, need ON. |
| nonFullConfig | The field is not present when the fullConfig is included or in case of handover to E-UTRA; otherwise it is optional present, need ON. |
| nonHO | The field is not present in case of handover within E-UTRA or to E-UTRA; otherwise it is optional present, need ON. |
| SCellAdd | The field is mandatory present upon SCell addition; otherwise it is not present. |
| SCellAdd2 | The field is mandatory present upon SCell addition; otherwise it is optionally present, need ON. |
| SCG-Resume | **The field is mandatory present upon NE-DC resume if the *RRCConnectionReconfiguartion* is included in the NR RRC message *RRCResume*; otherwise it is optionally present, need ON.** |

For (NG)EN-DC (MN E-UTRA, SN NR), for (NG)EN-DC, the UE was connected to E-UTRA as MN (either connected to EPC or 5GCN) and NR as SN before being suspended. When the UE resumes, it will receive an E-UTRA RRC message RRCConnectionResume, which can contain the NR SCG configurations in the field nr-SecondaryCellGroupConfig in an embedded NR Radio Resource Control (RRC) message RRCReconfiguration. This NR RRC message RRCReconfiguration will contain the field secondaryCellgroup (with the IE CellGroupConfig) which will contain the field spCellConfig. If the spCellConfig contains the field reconfigurationWithSync, the UE will perform a random access. In the current specification, this field is optional to include.

E-UTRA RRCConnection Resume message (36.331 v15.7.0)

```
RRCConnectionResume-v16xx-IEs ::= SEQUENCE {
    restoreMCG-SCells           ENUMERATED {true}
    OPTIONAL,  -- Need ON
```

E-UTRA RRCConnection Resume message (36.331 v15.7.0)

```
    restoreSCG                  ENUMERATED {true}
    OPTIONAL,  -- Need ON
    sCellToAddModList-r16       FFS-Value
    OPTIONAL,  -- Need ON
    sCellToReleaseList-r16      SCellToReleaseListExt-r13
    OPTIONAL,  -- Need ON
    nr-SecondaryCellGroupConfig OCTET STRING
    OPTIONAL,  -- Need ON
    nonCriticalExtension        SEQUENCE { }
    OPTIONAL
}
```

| NR RRCReconfiguration message (38.331 v15.7.0) | |
|---|---|
| RRCReconfiguration-IEs ::= | SEQUENCE { |
|   radioBearerConfig | RadioBearerConfig |
|   OPTIONAL, -- Need M | |
|   secondaryCellGroup | OCTET STRING |
|   (CONTAINING CellGroupConfig) | |
|   OPTIONAL, -- Need M | |
|   measConfig | MeasConfig |
|   OPTIONAL, -- Need M | |

| NR RRCReconfiguration message (38.331 v15.7.0) | |
|---|---|
|   lateNonCriticalExtension | OCTET STRING |
|   OPTIONAL, | |
|   nonCriticalExtension | RRCReconfiguration- |
|   v1530-IEs | OPTIONAL |
| } | |

| NR CellGroupConfig IE (38.331 v15.7.0) | |
|---|---|
| -- Configuration of one Cell-Group: | |
| CellGroupConfig ::= | SEQUENCE { |
|   cellGroupId | CellGroupId, |
|   rlc-BearerToAddModList | SEQUENCE |
|   (SIZE(1..maxLC-ID)) OF RLC-BearerConfig | OPTIONAL, |
| -- Need N | |
|   rlc-BearerToReleaseList | SEQUENCE |
|   (SIZE(1..maxLC-ID)) OF LogicalChannelIdentity | OPTIONAL, |
| -- Need N | |
|   mac-CellGroupConfig | MAC- |
| CellGroupConfig | |
|   OPTIONAL, -- Need M | |
|   physicalCellGroupConfig | |
| PhysicalCellGroupConfig | |
|   OPTIONAL, -- Need M | |
|   spCellConfig | SpCellConfig |
|   OPTIONAL, -- Need M | |
|   sCellToAddModList | SEQUENCE (SIZE |
|   (1..maxNrofSCells)) OF SCellConfig | OPTIONAL, -- |
| Need N | |
|   sCellToReleaseList | SEQUENCE (SIZE |
|   (1..maxNrofSCells)) OF SCellIndex | OPTIONAL, -- |
| Need N | |
|   ..., | |
|   [[ | |
|   reportUplinkTxDirectCurrent-v1530 | ENUMERATED |
| {true} | OPTIONAL -- |
| Cond BWP-Reconfig | |
|   ]] | |
| } | |
| -- Serving cell specific MAC and PHY parameters for a SpCell: | |
| SpCellConfig ::= | SEQUENCE { |
|   servCellIndex | ServCellIndex |
|   OPTIONAL, -- Cond SCG | |
|   reconfigurationWithSync | ReconfigurationWithSync |
|   OPTIONAL, -- Cond ReconfWithSync | |
|   rlf-TimersAndConstants | SetupRelease { RLF- |
| TimersAndConstants } | OPTIONAL, -- Need M |
|   rlmInSyncOutOfSyncThreshold | ENUMERATED {n1} |
|   OPTIONAL, -- Need S | |
|   spCellConfigDedicated | ServingCellConfig |
|   OPTIONAL, -- Need M | |
|   ... | |
| } | |
| ReconfigurationWithSync ::= | SEQUENCE { |
|   spCellConfigCommon | ServingCellConfigCommon |
|   OPTIONAL, -- Need M | |
|   newUE-Identity | RNTI-Value, |
|   t304 | ENUMERATED {ms50, |
| ms100, ms150, ms200, ms500, ms1000, ms2000, ms10000}, | |
|   rach-ConfigDedicated | CHOICE { |
|     uplink | RACH- |
| ConfigDedicated, | |
|     supplementaryUplink | RACH- |
| ConfigDedicated | |
|   } | |
|   OPTIONAL, -- Need N | |
|   ..., | |
|   [[ | |
|   smtc | SSB-MTC |
|   OPTIONAL -- Need S | |
|   ]] | |
| } | |

CellGroupConfig

| Conditional Presence | Explanation |
| --- | --- |
| BWP-Reconfig | The field is optionally present, Need N, if the BWPs are reconfigured or if serving cells are added or removed. Otherwise it is absent. |
| ReconfWithSync | The field is mandatory present in case of SpCell change, PSCell addition, PSCell resume with SCG reconfiguration, update of required SI for PSCell and AS security key change; otherwise it is optionally present, need M. The field is absent in the *masterCellGroup* in RRCResume or RRCSetup messages. |
| SCellAdd | The field is mandatory present upon SCell addition; otherwise it is absent, Need M. |
| SCellAddMod | The field is mandatory present upon SCell addition; otherwise it is optionally present, need M. |
| SCG | The field is mandatory present in an SpCellConfig for the PSCell. It is absent otherwise. |

For NR-DC (MN NR, SN NR), if both the MN and the SN are NR, when the UE resumes from RRC_INACTIVE it will receive an NR RRCResume message which can contain the field mrdc-SecondaryCellGroupConfig containing the mrdc-SecondaryCellGroup set to nr-SCG. This NR RRC message RRCReconfiguration will contain the field secondaryCellgroup (with the IE CellGroupConfig) which will contain the field spCellConfig. If the spCellConfig contains the field reconfigurationWithSync, the UE will perform a random access. In current specification, this field is optional to include. The changes required for the SCG will be the same as for (NG)EN-DC, as the NR SCG configuration will be the same (i.e., make the reconfigurationWithSync field mandatory in case of PSCell resume when RRC reconfigurations are included).

```
RRCReconfiguration-v1560-IEs ::=         SEQUENCE {
    mrdc-SecondaryCellGroupConfig        SetupRelease {
MRDC-SecondaryCellGroupConfig }              OPTIONAL,
-- Need M
    radioBearerConfig2                   OCTET STRING
(CONTAINING RadioBearerConfig)           OPTIONAL,
-- Need M
    sk-Counter                           SK-Counter
OPTIONAL,   -- Need N
    nonCriticalExtension                 SEQUENCE { }
OPTIONAL
}
MRDC-SecondaryCellGroupConfig ::=        SEQUENCE {
    mrdc-ReleaseAndAdd                   ENUMERATED {true}
OPTIONAL,   -- Need N
    mrdc-SecondaryCellGroup
        nr-SCG                           OCTET STRING
(CONTAINING RRCReconfiguration),
        eutra-SCG                        OCTET STRING
    }
}
```

Another embodiment of the present disclosure is to make the reconfigurationWithSync (for NR SCG) or mobilityControlInfoSCG (for E-UTRA SCG) mandatory to include whenever the SCG should be resumed, regardless of whether the old configurations would be restored without reconfigurations. This would mean that the network would have to include the SCG configuration including this field, even if all other configurations are provided with delta configurations. A flow chart that illustrates the operation of a wireless communication device 612 in accordance with an example of this embodiment is illustrated in FIG. 10.

Figure 10:
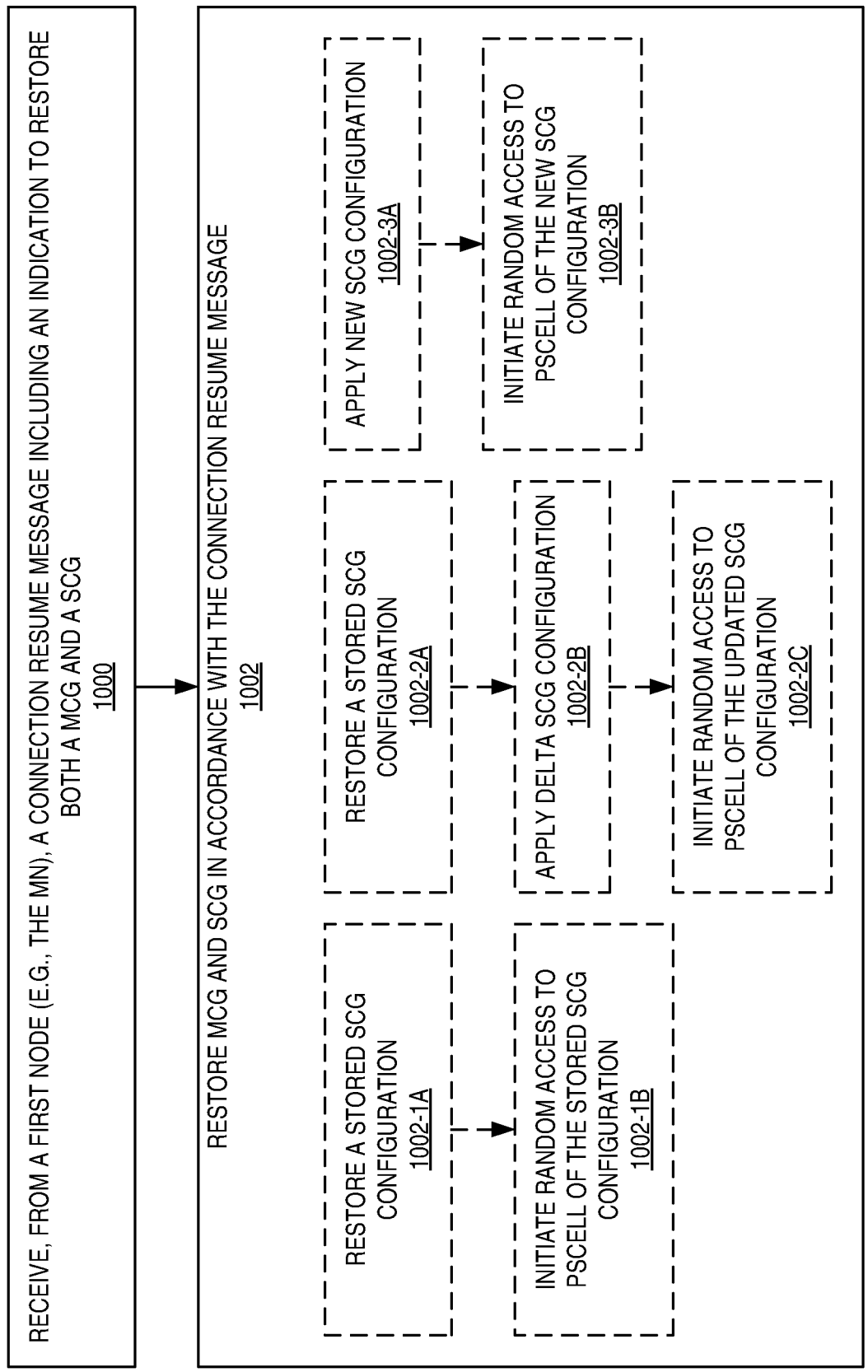
FIG. 10 is a flow chart that illustrates the operation of a wireless communication device for resuming a connection after being suspended to a dormant state while the wireless communication device was operating in DC with an MCG with a first network node and an SCG with a second network node in accordance with an embodiment of the present disclosure.

More specifically, FIG. 10 is a flow chart that illustrates the operation of a wireless communication device 612 for resuming a connection after being suspended to a dormant state while the wireless communication device 612 was operating in DC with a MCG with a first network node and an SCG with a second network node. Optional steps are represented by dashed lines/boxes. As illustrated, the wireless communication device 612 receives a connection resume message (e.g., an RRC Connection Resume message or RRC Resume message) with an indication to restore the SCG of the wireless communication device 612 (step 1000). As described above, in this embodiment, the connection resume message comprises information that is mandatory when the connection resume message comprises an indication to restore the SCG where the information that is mandatory comprises information that triggers random access towards a PSCell. For an NR SCG, the information that triggers random access towards the PSCell is reconfigurationWithSync. For an E-UTRA SCG, the information that triggers random access towards the PSCell is mobilityControlInfoSCG. In one embodiment, the information that is mandatory comprises reconfigurationWithSync or mobilityControlInfoSCG, regardless of whether a stored SCG configuration is to be restored without reconfiguration, as described above. The wireless communication device 612 restores the SCG in accordance with the received connection resume message (step 1002).

In one embodiment, the SCG is an NR SCG, and the information that is mandatory comprises reconfigurationWithSync. Further, in one embodiment, the MCG is an E-UTRA MCG. In another embodiment, the SCG is an E-UTRA SCG, and the information that is mandatory comprises mobilityControlInfoSCG. Further, in one embodiment, the MCG is an NR MCG.

In regard to restoring the SCG, in one embodiment, resuming the connection to the SCG comprises restoring a stored SCG configuration (step 1002-1A) and initiating random access with a PSCell of the restored SCG configuration (step 1002-1B). In another embodiment, the connection resume message comprises a delta SCG configuration, and restoring the SCG comprises restoring a stored SCG configuration (step 1002-2A), applying the delta SCG configuration on top of the restored SCG configuration to provide an updated SCG configuration (step 1002-2B), and initiating random access with a PSCell of the updated SCG configuration (step 1002-2C). In another embodiment, the connection resume message comprises a new SCG configuration, and restoring the SCG comprises applying the new SCG configuration (step 1002-3A) and initiating random access with a PSCell of the new SCG configuration (step 1002-3B).

Additional Aspects

Figure 11:
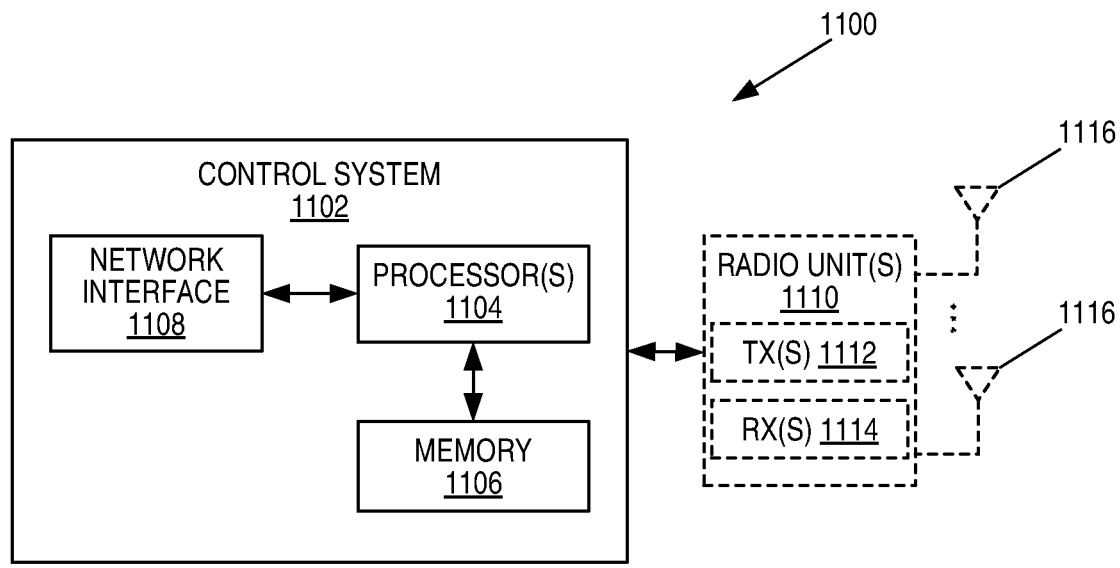
FIGS. 11 through 13 are schematic block diagrams of a radio access node in accordance with example embodiments of the present disclosure.

FIG. 11 is a schematic block diagram of a radio access node 1100 according to some embodiments of the present disclosure. Optional features are represented by dashed boxes. The radio access node 1100 may be, for example, a base station 602 or 606 or a network node that implements all or part of the functionality of the base station 602, eNB, or gNB described herein. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein (e.g., one or more functions described herein with respect to FIGS. 8 and 9 and any of the other embodiments or example implementations described above). In some embodiments, the function(s) are implemented in software that is stored, e.g., in the memory 1106 and executed by the one or more processors 1104.

Figure 12:
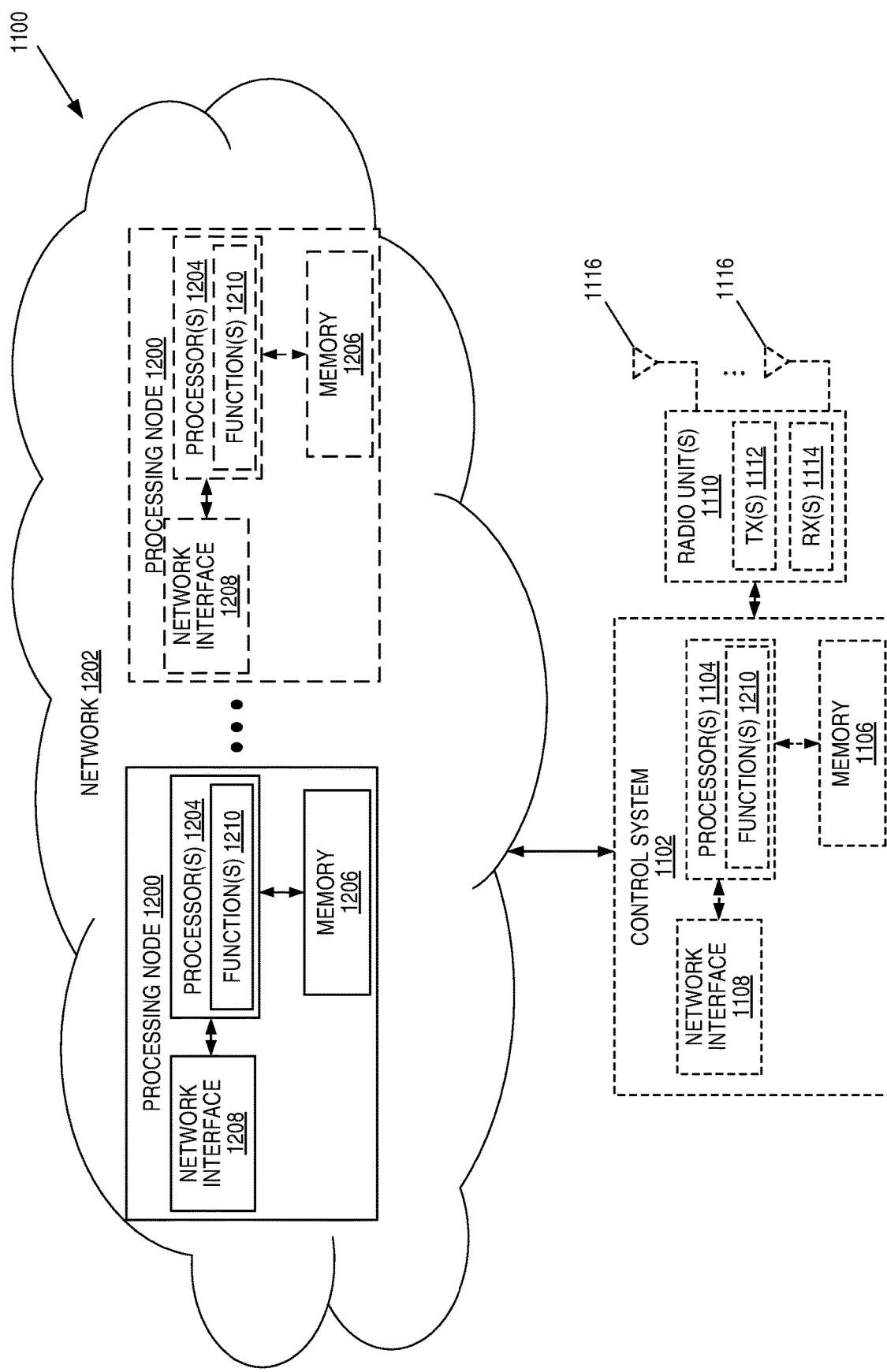

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the radio access node 1100 described herein (e.g., one or more functions described herein with respect to FIGS. 8 and 9 and any of the other embodiments or example implementations described above) are implemented at the one or more processing nodes 1200 or distributed across the one or more processing nodes 1200 and the control system 1102 and/or the radio unit(s) 1110 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
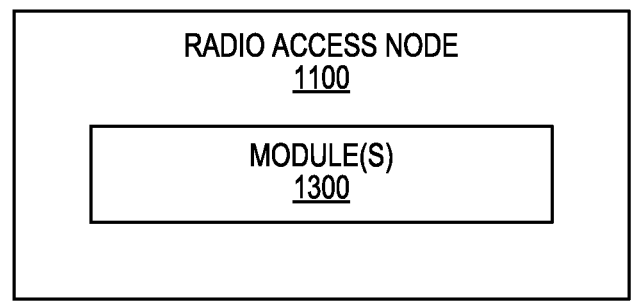

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein (e.g., one or more functions described herein with respect to FIGS. 8 and 9 and any of the other embodiments or example implementations described above). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
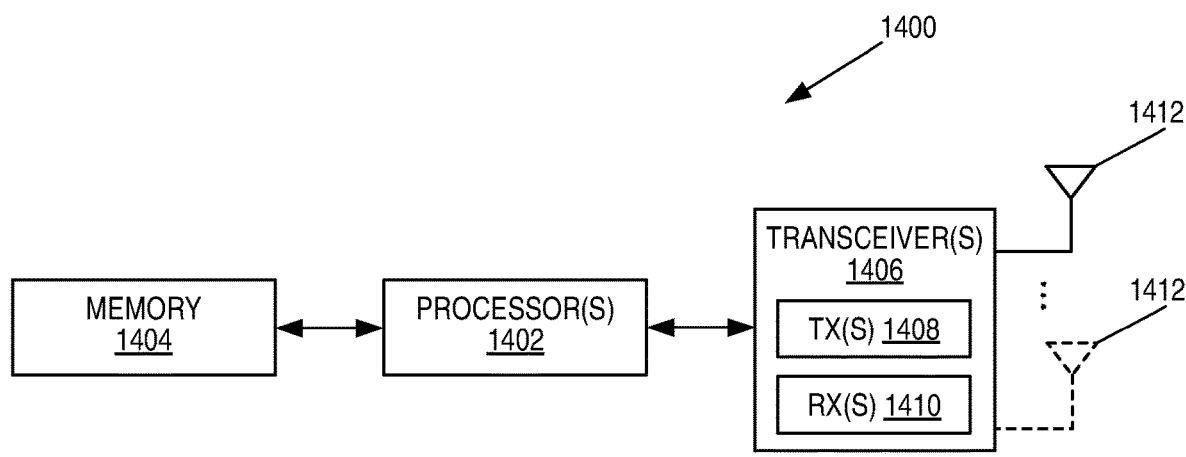
FIGS. 14 and 15 are schematic block diagrams of a wireless communication device in accordance with example embodiments of present disclosure.

FIG. 14 is a schematic block diagram of a wireless communication device 1400 according to some embodiments of the present disclosure. As illustrated, the wireless communication device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above (e.g., one or more functions described herein with respect to FIG. 7 and any of the other embodiments or example implementations described above) may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein (e.g., one or more functions described herein with respect to FIG. 7 and any of the other embodiments or example implementations described above) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
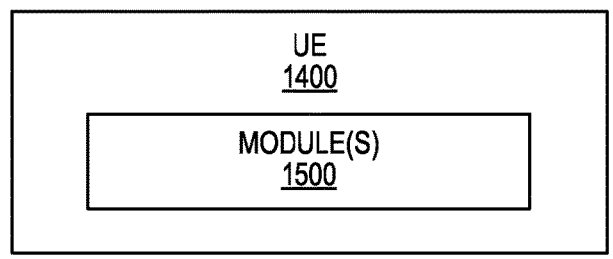

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein (e.g., one or more functions described herein with respect to FIG. 7 and any of the other embodiments or example implementations described above).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless communication device (612) for resuming a connection after being suspended to a dormant state while the wireless communication device (612) was operating in dual connectivity with a Master Cell Group, MCG, with a first network node and a Secondary Cell Group, SCG, with a second network node, the method comprising one or more of the following actions:
  receiving (700) (e.g., from the first network node) a connection resume message comprising an indication to resume both the MCG and the SCG;
  determining (702) whether a new SCG configuration or a delta SCG configuration is provided in the received connection resume message;
  upon determining (702, YES) that a new SCG configuration a delta SCG configuration is provided in the received connection resume message:
    applying (710) the new SCG configuration or the delta SCG configuration;
    detecting (712) that the new SCG configuration or the delta SCG configuration does not include particular information (e.g., ReconfigurationWithSync or MobilityControlInfoSCG); and
  upon detecting (712) that the new SCG configuration or the delta SCG configuration does not include the particular information:
    start synchronizing (714) with a Primary SCG Cell, PSCell, of the second network node; and
    initiating (716) random access with the PSCell of the second network node.

Embodiment 2: The method of embodiment 1 herein the particular information is ReconfigurationWithSync.

Embodiment 3: The method of embodiment 1 wherein the particular information is MobilityControlInfoSCG.

Embodiment 4: The method of any one of embodiments 1 to 3 further comprising, upon determining (702, NO) that a new SCG configuration a delta SCG configuration is not provided in the received connection resume message, restoring (704) a stored SCG configuration for the wireless communication device (612), start synchronizing (706) with a PSCell of the stored SCG configuration, and initiating (708) random access with the PSCell of the stored SCG configuration.

Group B Embodiments

Embodiment 5: A method performed by a second network node that serves as a Secondary Node, SN, of a Secondary Cell Group, SCG, of a wireless communication device (612) after the wireless communication device (612) has been suspended to a dormant state while the wireless communication device (612) was operating in dual connectivity with a Master Cell Group, MCG, with a first network node and the SCG, with the second network node, the method comprising: receiving (800) (e.g., from the first network node) an indication to resume the SCG for the wireless communication device (612).

Embodiment 6: The method of embodiment 5 further comprising performing (802) one or more operational tasks related to resuming the SCG for the wireless communication device (612) upon receiving (800) the indication.

Embodiment 7: A method performed by a second network node that serves as a Secondary Node, SN, of a Secondary Cell Group, SCG, of a wireless communication device (612) after the wireless communication device (612) has been suspended to a dormant state while the wireless communication device (612) was operating in dual connectivity with a Master Cell Group, MCG, with a first network node and the SCG, with the second network node, the method comprising one or more of the following actions:
  receiving (900) (e.g., from the first network node) an indication to resume the SCG for the wireless communication device (612);
  determining (902) whether a stored SCG configuration for the wireless communication device (612) can be reused as is;
  upon determining (902, YES) that the stored SCG configuration for the wireless communication device (612) cannot be reused as is, sending (906), to the first network node, an SCG configuration that includes an indication for the wireless communication device (612) to:
    start synchronizing with a Primary SCG Cell, PSCell, of the stored SCG configuration;
    initiate random access with the PSCell of the stored SCG configuration; or
    both start synchronizing with the PSCell of the stored SCG configuration and initiate random access with the PSCell of the stored SCG configuration.

Embodiment 8: The method embodiment 7 further comprising, upon determining (902, NO) that the stored SCG configuration for the wireless communication device (612)

can be reused as is, sending (906), to the first network node, an indication that the SCG can be resumed as is.

Embodiment 9: The method of embodiment 7 or 8 further comprising: receiving (908) a random access request from the wireless communication device (612); and sending (910) a random access response to the wireless communication device (612).

Group C Embodiments

Embodiment 10: A wireless communication device comprising: processing circuitry configured to perform any of the steps of any of the Group A embodiments; and power supply circuitry configured to supply power to the wireless communication device.

Embodiment 11: A network node comprising: processing circuitry configured to perform any of the steps of any of the Group B embodiments; and power supply circuitry configured to supply power to the network node.

Embodiment 12: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

At least some of the following abbreviations may be used in this disclosure. If there is an inconsistency between abbreviations, preference should be given to how it is used above. If listed multiple times below, the first listing should be preferred over any subsequent listing(s).

- 3GPP Third Generation Partnership Project
- 5G Fifth Generation
- 5GCN Fifth Generation Core Network
- 5GS Fifth Generation System
- AMF Access and Mobility Function
- AS Access Stratum
- ASIC Application Specific Integrated Circuit
- AUSF Authentication Server Function
- CA Carrier Aggregation
- CP Control Plane
- CPU Central Processing Unit
- CR Change Request
- DC Dual Connectivity
- DRB Data Radio Bearer
- DSP Digital Signal Processor
- eLTE Enhanced Long Term Evolution
- eNB Enhanced or Evolved Node B
- EN-DC Evolved Universal Terrestrial Radio Access New Radio Dual Connectivity
- EPC Evolved Packet Core
- E-UTRA Evolved Universal Terrestrial Radio Access
- FPGA Field Programmable Gate Array
- gNB New Radio Base Station
- gNB-CU New Radio Base Station Central Unit
- gNB-DU New Radio Base Station Distributed Unit
- HSS Home Subscriber Server
- IE Information Element
- IoT Internet of Things
- I-RNTI Inactive Radio Network Temporary Identifier
- LTE Long Term Evolution
- MAC Medium Access Control
- MCG Master Cell Group
- MeNB Master Enhanced or Evolved Node B
- MME Mobility Management Entity
- MN Master Node
- MR Multi-Radio
- MR-DC Multi-Radio Dual Connectivity
- MTC Machine Type Communication
- NE-DC New Radio Evolved Universal Terrestrial Radio Access Dual Connectivity
- NEF Network Exposure Function
- NF Network Function
- ng-eNB Next Generation Enhanced or Evolved Node B
- NGEN-DC Next Generation Radio Access Network Evolved Universal Terrestrial Radio Access New Radio Dual Connectivity
- NG-RAN Next Generation Radio Access Network
- NR New Radio
- NRF Network Function Repository Function
- NSSF Network Slice Selection Function
- PC Personal Computer
- PCell Primary Cell
- PCF Policy Control Function
- PDCP Packet Data Convergence Protocol
- P-GW Packet Data Network Gateway
- PHY Physical
- PSCell Primary Secondary Cell Group Cell
- RAM Random Access Memory
- RAN Radio Access Network
- RAT Radio Access Technology
- RB Radio Bearer
- RLC Radio Link Control
- ROM Read Only Memory
- RRC Radio Resource Control
- RRH Remote Radio Head
- SA Stand-Alone
- SCEF Service Capability Exposure Function
- SCell Secondary Cell
- SCG Secondary Cell Group
- SDAP Service Data Adaptation Protocol
- SMF Session Management Function
- SN Secondary Node
- SpCell Special Cell
- SRB Signaling Radio Bearer
- TS Technical Specification
- UDM Unified Data Management
- UE User Equipment
- UP User Plane
- UPF User Plane Function
- WI Work Item Those skilled in the art will recognize improvements and modifications to the embodiments of the present disclosure. All such improvements and modifications are considered within the scope of the concepts disclosed herein.

What is claimed is:

1. A method performed by a wireless communication device for resuming a connection after being suspended to a dormant state while the wireless communication device was operating in dual connectivity with a Master Cell Group (MCG) with a first network node and a Secondary Cell Group (SCG) with a second network node, the method comprising:
   receiving a connection resume message with an indication to restore the SCG of the wireless communication device, the connection resume message comprising information that is mandatory when the connection resume message comprises an indication to restore the SCG, where the information that is mandatory comprises reconfiguration WithSync or mobilityControlInfoSCG; and restoring the SCG in accordance with the connection resume message.

2. The method of claim 1, wherein the SCG is a New Radio (NR) SCG and the information that is mandatory comprises reconfiguration WithSync.

3. The method of claim 2, wherein the MCG is either an NR MCG or an Evolved Universal Terrestrial Radio Access (E-UTRA) MCG.

4. The method of claim 1, wherein the SCG is an Evolved Universal Terrestrial Radio Access (E-UTRA) SCG, and the information that is mandatory comprises mobilityControlInfoSCG.

5. The method of claim 4, wherein the MCG is a New Radio (NR) MCG.

6. The method of claim 1, wherein the information that is mandatory comprises reconfiguration WithSync or mobilityControlInfoSCG, regardless of whether a stored SCG configuration is to be restored without reconfiguration.

7. The method of claim 1, wherein restoring the SCG comprises:
  restoring a stored SCG configuration; and
  initiating random access with a Primary SCG Cell (PS-Cell) of the restored SCG configuration.

8. The method of claim 1, wherein the connection resume message comprises a delta SCG configuration, and restoring the SCG comprises:
  restoring a stored SCG configuration;
  applying the delta SCG configuration on top of the restored SCG configuration to provide an updated SCG configuration; and
  initiating random access with a Primary SCG Cell (PS-Cell) of the updated SCG configuration.

9. The method of claim 1, wherein the connection resume message comprises a new SCG configuration, and restoring the SCG comprises:
  applying the new SCG configuration; and
  initiating random access with a Primary SCG Cell (PS-Cell) of the new SCG configuration.

10. A wireless communication device for resuming a connection after being suspended to a dormant state while the wireless communication device was operating in dual connectivity with a Master Cell Group (MCG) with a first network node and a Secondary Cell Group (SCG) with a second network node, the wireless communication device comprising:
  one or more transmitters;
  one or more receivers; and
  processing circuitry associated with the one or more transmitters and the one or more receivers, the processing circuitry being configured to cause the wireless communication device to:
    receive a connection resume message with an indication to restore the SCG of the wireless communication device, the connection resume message comprising information that is mandatory when the connection resume message comprises an indication to restore the SCG, where the information that is mandatory comprises reconfiguration WithSync or mobilityControlInfoSCG; and
    restore the SCG in accordance with the connection resume message.

11. A method performed by a network node for resuming a connection of a wireless communication device after the wireless communication device was suspended to a dormant state while the wireless communication device was operating in dual connectivity with a Master Cell Group (MCG) with a first network node and a Secondary Cell Group (SCG) with a second network node, the method comprising:
  sending, to the wireless communication device, a connection resume message with an indication to restore the SCG of the wireless communication device, the connection resume message comprising information that is mandatory when the connection resume message comprises an indication to restore the SCG, where the information that is mandatory comprises reconfiguration WithSync or mobilityControlInfoSCG.

12. The method of claim 11, wherein the SCG is a New Radio (NR) SCG and the information that is mandatory comprises reconfiguration WithSync.

13. The method of claim 12, wherein the MCG is either an NR MCG or an Evolved Universal Terrestrial Radio Access (E-UTRA) MCG.

14. The method of claim 11, wherein the SCG is an Evolved Universal Terrestrial Radio Access (E-UTRA) SCG and the information that is mandatory comprises mobilityControlInfoSCG.

15. The method of claim 14, wherein the MCG is a New Radio (NR) MCG.

16. The method of claim 11, wherein the information that is mandatory comprises reconfiguration WithSync or mobilityControlInfoSCG, regardless of whether a stored SCG configuration is to be restored without reconfiguration.

17. The method of claim 11, wherein the network node is the first network node.

18. The method of claim 11, wherein the network node is the second network node.

19. A network node for resuming a connection of a wireless communication device after the wireless communication device was suspended to a dormant state while the wireless communication device was operating in dual connectivity with a Master Cell Group (MCG) with a first network node and a Secondary Cell Group (SCG) with a second network node, the network node comprising processing circuitry configured to cause the network node to:
  send, to the wireless communication device, a connection resume message with an indication to restore the SCG of the wireless communication device, the connection resume message comprising information that is mandatory when the connection resume message comprises an indication to restore the SCG, where the information that is mandatory comprises reconfiguration WithSync or mobilityControlInfoSCG.

* * * * *

UNITED STATES PATENT AND TRADEMARK OFFICE
CERTIFICATE OF CORRECTION

| | |
|---|---|
| PATENT NO. | : 12,245,316 B2 |
| APPLICATION NO. | : 17/764775 |
| DATED | : March 4, 2025 |
| INVENTOR(S) | : Teyeb et al. |

It is certified that error appears in the above-identified patent and that said Letters Patent is hereby corrected as shown below:

In the Specification

In Column 12, Line 20, delete "Access and Mobility Function (AMF)," and insert -- Access and Mobility Management Function (AMF), --, therefor.

In Column 34, Line 33, delete "on" and insert -- one --, therefor.

In Column 36, Line 5, delete "herein" and insert -- wherein --, therefor.

In Column 37, Line 44, delete "Access and Mobility Function" and insert -- Access and Mobility Management Function --, therefor.

In Column 38, Line 21, delete "Network Function" and insert -- Network --, therefor.

In the Claims

In Column 39, Line 4, in Claim 1, delete "reconfiguration WithSync" and insert -- reconfigurationWithSync --, therefor.

In Column 39, Line 10, in Claim 2, delete "reconfiguration WithSync" and insert -- reconfigurationWithSync --, therefor.

In Column 39, Line 21, in Claim 6, delete "reconfiguration WithSync" and insert -- reconfigurationWithSync --, therefor.

In Column 40, Line 4, in Claim 10, delete "reconfiguration WithSync" and insert -- reconfigurationWithSync --, therefor.

In Column 40, Lines 21-22, in Claim 11, delete "reconfiguration WithSync" and insert -- reconfigurationWithSync --, therefor.

Signed and Sealed this
Twenty-first Day of October, 2025

John A. Squires
*Director of the United States Patent and Trademark Office*

CERTIFICATE OF CORRECTION (continued)
U.S. Pat. No. 12,245,316 B2

In Column 40, Line 25, in Claim 12, delete "reconfiguration WithSync." and insert -- reconfigurationWithSync. --, therefor.

In Column 40, Line 36, in Claim 16, delete "reconfiguration WithSync" and insert -- reconfigurationWithSync --, therefor.

In Column 40, Line 57, in Claim 19, delete "reconfiguration WithSync" and insert -- reconfigurationWithSync --, therefor.